(12) United States Patent
Maruyama

(10) Patent No.: US 6,816,731 B1
(45) Date of Patent: Nov. 9, 2004

(54) MOBILE STATION EQUIPMENT, BASE STATION EQUIPMENT, EXCHANGE, AND MOBILE COMMUNICATION SYSTEM

(75) Inventor: Jyoji Maruyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/537,774

(22) Filed: Mar. 29, 2000

(51) Int. Cl.⁷ ................................................. H04Q 7/20
(52) U.S. Cl. ...................... 455/441; 455/238.1; 455/567
(58) Field of Search ........................... 455/456.1–456.3, 455/238.1, 567, 423, 436, 439, 413, 515, 441, 550.1, 575.1, 560, 561, 444, 67.11, 575.9, 401, 412, 517, 552.1, 458, 67.1, 575, 422; 340/441; 370/431, 335, 252, 342, 464, 465, 479; 375/144, 147, 146, 219

(56) References Cited

U.S. PATENT DOCUMENTS

| | | | |
|---|---|---|---|
| 5,375,253 A | * 12/1994 | Lopponen | 455/54.1 |
| 5,448,751 A | * 9/1995 | Takenaka | 455/33.1 |
| 5,590,177 A | * 12/1996 | Vilmur et al. | 370/60 |
| 6,014,566 A | * 1/2000 | Owada | 455/444 |
| 6,108,532 A | * 8/2000 | Matsuda et al. | 455/413 |
| 6,263,190 B1 | * 7/2001 | Mamori et al. | 455/67.1 |
| 6,311,078 B1 | * 10/2001 | Hardouin | 455/567 |

FOREIGN PATENT DOCUMENTS

| | | |
|---|---|---|
| JP | 10154955 | 6/1998 |
| JP | 10190557 | 7/1998 |
| JP | 10224865 | 8/1998 |
| JP | 10257555 | 9/1998 |
| JP | 11004479 | 1/1999 |

* cited by examiner

*Primary Examiner*—Edward F. Urban
*Assistant Examiner*—C. Chow
(74) *Attorney, Agent, or Firm*—Katten Muchin Zavis Rosenman

(57) ABSTRACT

Mobile station equipment, base station equipment, and an exchange equipped with all or some units for monitoring the speed of a mobile station, making a judgment whether or not the speed exceeds a given threshold value, and restricting both or at least one of channel control and call processing regarding a call occurring at the corresponding mobile station. These mobile station equipment, base station equipment, and exchange operate alone or associate with each other through radio transmission paths or other links. Further a mobile communication system may include these mobile station equipment, base station equipment, and exchange. In the above equipment exchange, accidents normally caused by some operation of an operator on the mobile station equipment in response to a call occurring in the mobile station equipment moving at a high speed are prevented efficiently and reliably.

33 Claims, 14 Drawing Sheets

MOBILE STATION EQUIPMENT, BASE STATION EQUIPMENT, EXCHANGE, AND MOBILE COMMUNICATION SYSTEM

BACKGROUND OF THE INVENTION

1. Field of the Invention

The present invention relates to mobile station equipment that is carried on a mobile unit or in a mobile vehicle or carried by a subscriber to offer communications services to the subscriber. The invention also relates to base station equipment for forming a wireless zone in a region where a mobile station can be positioned and providing channel control in the wireless zone. Furthermore, the invention relates to an exchange that associates with this base station equipment and performs call processing. In addition, the invention relates to a mobile communication system composed of such mobile station equipment, base station equipment, and exchange.

2. Description of the Related Art

In recent years, mobile communication systems have become rapidly widespread because of competition among communication service providers and liberalization of the market. Therefore, subscribers receive various kinds of communication services through in-vehicle terminals, as well as through transportable terminals.

FIG. 14 illustrates an example of configuration of a mobile communication system.

In this figure, mobile station equipment 80 is located within a wireless zone 82 formed by radio base station equipment 81, which is connected with radio control station equipment 83 through a communication link 81L. An exchange 84 connected with switching networks and home location registers (none of which are shown) is connected with the radio control station equipment 83 through a communication link 84L.

The mobile station equipment 80 comprises: antennas 85M-1, 85M-2; a TX/RX part 86M connected with the loading points of these antennas; a processor 87M having input/output ports connected with the control terminals of the TX/RX part 86M and with the output of a speedometer (not shown); a microphone 88 and a receiver 89 both connected with the modulation input and demodulation output, respectively, of the TX/RX part 86M; and a operation/indication part 90 connected with given input/output ports of the processor (CPU) 87M.

The radio base station equipment 81 comprises: an antenna 85B; a TX/RX part 86B connected with the loading point of the antenna 85B; a transmission path interfacing part 91B connected with the modulation/demodulation terminal of the TX/RX part 86B and with one end of the communication link 81L described above; and a processor (CPU) 87B, whose input and output ports of the processor 87B are connected with the control terminals of the TX/RX part 86B and of the transmission path interfacing part 91B.

The radio control station equipment 83 comprises a transmission path interfacing part 91C and an exchange interfacing part 92 both cascaded between the other end of the communication link 81L and one end of the communication link 84L, and a processor (CPU) 87C whose input and output ports are connected with the control terminals of the transmission path interfacing part 91C and of the exchange interfacing part 92.

The exchange 84 comprises: a radio interfacing part (RI) 93 directly connected with the other end of the transmission path 84L; a switch 94 having ports connected with the radio interfacing part 93 and the aforementioned switching networks, respectively; and a processor (CPU) 87E having communication ports connected with the aforementioned radio interfacing part 93, the switch 94, and home location register, respectively.

In the mobile communication system of the construction described so far, the TX/RX part 86B incorporated in the radio base station equipment 81 forms the wireless zone 82 under control of the processor 87B and interfaces, through the transmission path interfacing part 91B, with the communication link 81L and the radio channel both forming the wireless zone 82.

In the radio control station equipment 83, the processor 87C cooperates with the processor 87B disposed opposite to the processor 87C through the transmission path interfacing part 91C, the communication link 81L, and the transmission path interfacing part 91B, and performs channel control of the wireless zone (radio channels).

The transmission path interfacing part 91C and the exchange interfacing part 92 interface the communication links 81L and 84L with each other, based on the procedure of the channel control performed by the processor 87C in this way.

In the exchange 84, the processor 87E performs, by associating with the processor 87C that is located opposite to the processor 87E through the radio interfacing part 93, the communication link 84L, and the exchange interfacing part 92, call processing of the following termination call, terminating from the switching networks to the mobile station equipment 80 and the originating calls of the mobile station equipment 80 that are identified by the radio interfacing part 93.

The call processing adapts to the aforementioned channel control. The originating calls may contain calls for location updating. This call processing contains setting and resetting of a speech path to the switch 94.

In the mobile station equipment 80, when a origination request a call containing a phone number is given by the operation/indication part 90, for example, the processor 87M transmits an origination call signal to a certain radio channel formed by the radio base station equipment 81, and performs the channel control by associating associates with the processor 87B incorporated in the radio base station equipment 81 and with the processor 87C incorporated in the radio control station equipment 83.

When the corresponding origination call is completed based on the procedure of the channel control, the TX/RX part 86M secures a full duplex communication path between the mobile station equipment 80 and the radio base station equipment 81 by matching the speech signal to be sent and received through the microphone 88 and the receiver 89 to the radio channel assigned by the processor 87C incorporated in the radio control station equipment 83 over the period during which the completed call persists.

The processor 87M obtains the speed of the local station given by the speedometer described above and judges whether this speed is greater or smaller than a given upper limit.

The processor 87B recognizes the period for which the speed exceeds the upper limit. During this period, the processor 87B refrains from performing processing that should be invoked as the aforementioned channel control in response to an origination request given by the operation/indication part 90 and/or a paging signal that is sent by the radio base station equipment 81 and addressed to the local station through the antennas 85M-1, 85M-2, and TX/RX part 86M. At the same time, the processor 87B refrains from performing processing associated with location updating that should be invoked based on the procedure of the channel control.

In particular, as long as the upper limit described above is predetermined to a preferable value while the mobile unit or vehicle carrying the mobile station equipment 80 is moving at a high speed, origination calls and response to terminating calls for which the operation/indication part 90 is operated in some manner are restricted. Furthermore, location updating that is a factor of the transition to a state in which a subscriber can perform such operations are permitted is prolonged.

Accordingly, accidents that would normally be caused by user's operation on the mobile station equipment 80 while the mobile station equipment 80 is moving at a high speed are prevented with high reliability.

The TX/RX part 86M monitors the field strength level of receiving waves that reached the antennas 85M-1, 85M-2 from the antenna 85B incorporated in the radio base station equipment 81. The TX/RX part 86M appropriately selects the receiving waves of greater field strength level from those receiving waves and thus maintains high the speech quality according to switching diversity. The receiving waves are not restricted to waves that reach the antennas 85M-1, 85M-2 through the radio channel used for speech.

In the conventional configuration described above, the output of the speedometer described above is connected with the corresponding input port of the processor 87M through a dedicated connector and so there is the possibility that the connector is intentionally removed by the driver or that the driver forgets reattaching the connector after once removed.

In particular, the mobile unit or vehicle carrying the mobile station equipment 80 is able to run at a high speed without attaching the connector and, therefore, prevention of the aforementioned accidents cannot be accomplished reliably due to lack of driver's safety mind or human errors.

Such inappropriate removal of the connector can be prevented certainly by incorporating dedicated hardware in the mobile station equipment 80 to measure the moving speed of the moving unit or vehicle instead of the speedometer and to inform the processor 87M of the moving speed.

However, this configuration lowers of the cost effectiveness of the mobile station equipment and increases the cost. Although this configuration may be applied to newly manufactured mobile station equipment, it is impossible to apply it to already operating mobile station equipment or to those kinds of mobile station equipment which are not operated but appear on the market.

Consequently, it has not been assured that the aforementioned accidents are prevented.

SUMMARY OF THE INVENTION

It is an object of the present invention to provide mobile station equipment, base station equipment, exchange, and mobile communication system that can prevent the aforementioned accidents economically and reliably without modifying the standard hardware structure.

It is another object of the invention to provide technologies for efficiently and reliably preventing accidents which would normally be caused by some operation by a human operator in response to a call occurring while the unit or vehicle is moving at a high speed.

It is a further object of the invention to prevent the aforementioned accidents, according to the procedure of the channel control provided by a base station or the call processing performed by an exchange associated with this base station.

It is a yet other object of the invention to provide technologies that enable speed obtained by mobile station equipment according to the invention to be effectively utilized by a base station or an exchange.

It is a still other object of the invention to provide technologies for adapting to the form of channel control or call processing flexibly and reliably.

It is an additional object of the invention to provide technologies for distributing functions or load in a desired manner between a base station and an exchange performing call processing associating-with the base station.

It is a yet further object of the invention to provide technologies for flexibly adapting to the procedure of the channel control provided by a mobile station or the call processing performed by an exchange, as well as the speed of the mobile station.

It is a yet additional object of the invention to provide technologies for preventing the aforementioned accidents reliably while flexibly matching the form of channel control or call processing.

It is a still additional object of the invention to provide technologies for distributing either or both of the functions and/or the load between a mobile station and an exchange.

It is a further object of the invention to provide technologies for improving the quality of services offered to a mobile station and maintaining the quality high.

It is a further object of the invention to provide technologies for flexibly adapting to the specifications and structure of a mobile communication system without substantially increasing the cost and for enhancing the safety of the subscriber, as well as the quality of services.

The objects described above are achieved by mobile station equipment, base station equipment, and exchange which comprise some or all of sections for monitoring the speed of a mobile station, section for judging whether or not the speed exceeds a predetermined threshold value, and section for restricting either or both of channel control and call setting for a call occurring at the corresponding mobile station when the result of the judgement is true. These mobile station equipment, base station equipment, and exchange operate alone or are associated with each other through radio transmission paths or other links.

In these mobile station equipment, base station equipment, and exchange, accidents which would normally be caused by some operation of a human operator in response to a call that occurred while the mobile station is moving at a high speed are prevented efficiently and reliably.

The aforementioned objects are achieved by mobile station equipment characterized in that the speed of the local station is obtained based on a change in an attribute of receiving waves reached from a radio base station.

In this mobile station equipment, the speed of the mobile station equipment is obtained according to the receiving wave that reached the local station from the base station and so the size of the hardware is reduced greatly compared with the case where a dedicated section for obtaining the speed is provided.

The aforementioned objects are also achieved by mobile station equipment characterized in that a navigational system is installed and that the speed of the local station is obtained as a rate of change in the location of the local station given by the navigational system.

In this mobile station equipment, the speed of the mobile station equipment is obtained as long as the speed monitoring section operates normally according to the aforementioned radio navigation or self-contained navigation, even if the quality of receiving waves that reached the local station from a radio base station is quite poor.

Accordingly, the state in which the channel control should be aborted because the mobile station equipment is moving at a high speed is recognized with high accuracy.

The aforementioned objects are also achieved by base station equipment characterized in that the speed of a mobile station is obtained according to a change in an attribute of receiving waves coming from the mobile station.

In this base station equipment, the speeds of individual mobile stations are obtained according to waves received from these mobile stations and, therefore, the size of hardware is greatly reduced compared with the case where dedicated sections for obtaining the speeds are provided.

The aforementioned objects are also achieved by an exchange characterized in that the speed of a mobile station is obtained according to the frequency at which the transmission quality of a baseband signal obtained by demodulating receiving waves reaching the local station from the mobile station deteriorates.

In this exchange, the speeds of individual mobile stations are obtained according to each received wave that reached the local station from each mobile station and, therefore, the size of the hardware is reduced greatly compared with the case where dedicated sections for obtaining the speeds are provided.

The aforementioned objects are also achieved by a mobile station equipment, a base station equipment, and an exchange characterized in that they perform man-machine interfacing that is involved in the notification that said restriction is to be made.

In these mobile station equipment, base station equipment, and exchange, the operator can recognize that the reason why some of the origination, termination, and location updating are restricted or why the conversation is forced to be aborted is because of the high-speed movement of the local station. Alternatively, the operator can recognize the existence of a mobile station for which conversation is aborted as described above.

The aforementioned objects are also achieved by an exchange characterized in that calls to be restricted are judged according to either or both of originating class and/or termination class.

In this exchange, call processing is aborted irrespective of the service class of originating party or terminating party and so restriction of originating or termination calls and compulsory clearing of these calls are avoided.

The aforementioned objects are also achieved by mobile station equipment, base station equipment, and exchange characterized in that information necessary for retrial or continuation of channel control or call setting for the restricted calls is kept by them and that the retrial is automatically performed when they are in a state in which the restriction should be canceled.

In these mobile station equipment, base station equipment, and exchange, originating party and terminating party of the restricted calls that are restricted due to the high-speed of a mobile station equipment that is an originating party or terminating party can easily converse without having cumbersome operations associated with re-origination or callback when the speed is below the upper limit.

The aforementioned objects are also achieved by a mobile station equipment, a base station equipment, and an exchange characterized in that channel control or call setting necessary to compulsorily abort the corresponding completed call is performed when the speed of the mobile station exceeds the predetermined upper limit while the completed call exists.

In the mobile station equipment, base station equipment, and exchange, conversation with a mobile station at a speed exceeding the upper limit is quickly interrupted and so accidents due to the high speed of the vehicle can be prevented precisely.

The aforementioned objects are also achieved by a base station equipment that is a combination of base station control equipment and radio base station equipment, wherein the base station control equipment is a main component providing channel control, and the radio base station equipment interfaces with this base station equipment and a radio transmission path.

In this base station equipment, it is possible to flexibly adapt itself to a zone configuration or channel allocation, as well as to an area in which mobile stations can be located and to the distribution of these mobile stations in this area. Consequently, the service quality is improved and maintained high.

The aforementioned objects are also achieved by a mobile communication system that is a combination of the aforementioned mobile station equipment, base station equipment, and exchange.

In this mobile communication system, when any call occurs in the mobile station equipment, accidents which would normally be caused when the speed of the mobile station equipment exceeds a predetermined upper limit can be prevented reliably by association of the mobile station equipment with the aforementioned radio base station equipment, radio control station equipment, and exchange.

The nature, principle, and utility of the invention will become apparent from the following detailed description when read in conjunction with the accompanying drawings in which like parts are designated by identical reference numbers

DESCRIPTION OF THE PREFERRED EMBODIMENTS OF THE INVENTION

The principles of mobile station equipment, base station equipment, exchange, and mobile communication system according to the present invention are first described.

Figure 1:
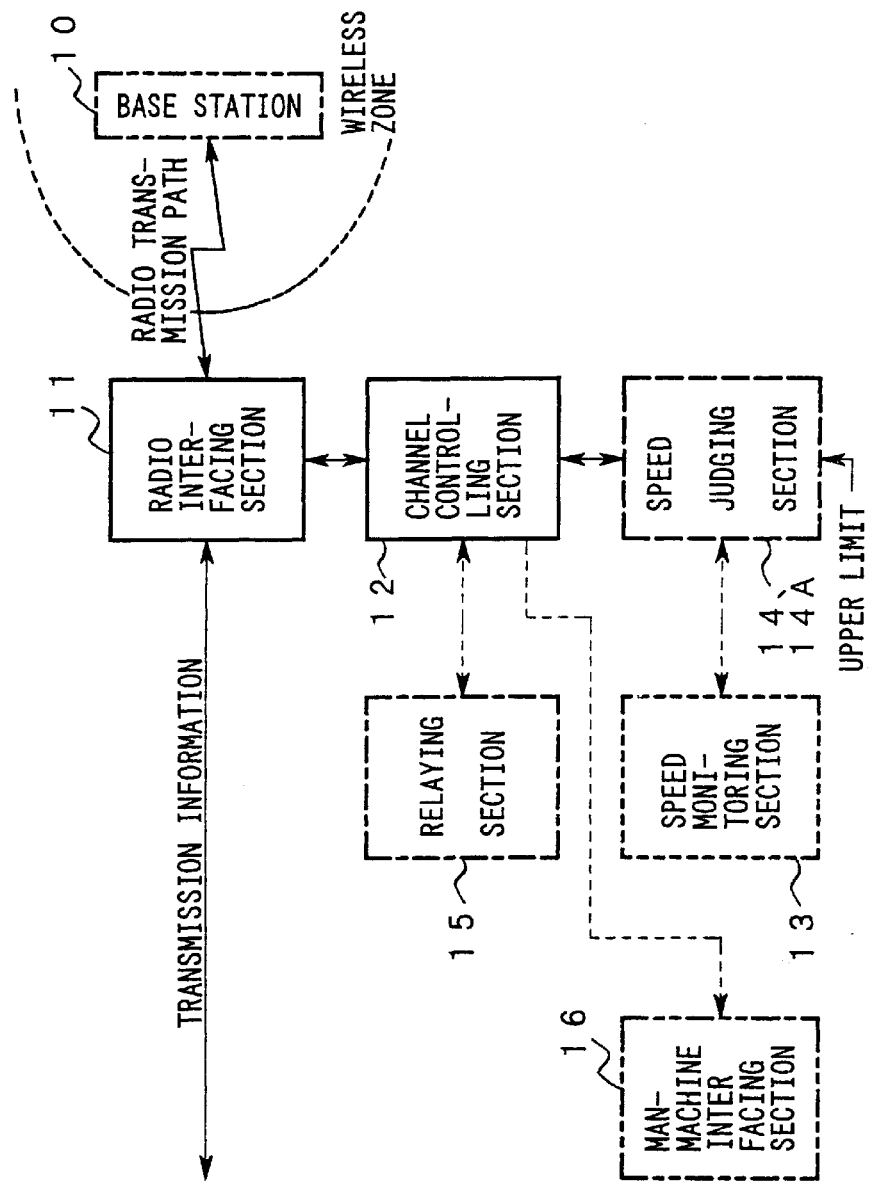
FIG. 1 is a block diagram illustrating the principle of mobile station equipment according to the present invention.

FIG. 1 illustrates the principle of mobile station equipment according to the present invention.

This mobile station equipment comprises a radio interfacing section 11, a channel controlling section 12, a speed monitoring section 13, speed judging section 14, 14A, a relaying section 15, and a man-machine interfacing section 16.

The principle of the first mobile station equipment according to the present invention is as follows.

The radio interfacing section 11 forms a radio transmission path between this radio interfacing section 11 and a base station 10 forming a wireless zone. The radio interfacing section 11 transmits and receives information through the radio transmission path. The channel controlling section 12 associates with the base station 10 through the radio interfacing section 11 and through the radio transmission path formed by the radio interfacing section 11, and performs channel control in the wireless zone. The speed monitoring section 13 obtains the speed of the local station. The speed judging section 14 judges whether or not the speed obtained by the speed monitoring section 13 exceeds a predetermined upper limit. When the result of the judgement made by the speed judging section 14 is true, the channel controlling section 12 aborts the channel control for calls associated with the local station.

The operation of the mobile station equipment constructed as described above is as follows.

The speed monitoring section 13 obtains the speed of the local station. The speed judging section 14 judges whether or not the speed exceeds a predetermined upper limit. The channel controlling section 12 associates with the base station 10 through the radio interfacing section 11 and through the radio transmission path formed by the radio interfacing section 11. The channel controlling section 12 performs channel control for the wireless zone formed by the base station 10, and aborts the channel control for the call of the local station when the result of the judgement is true.

In particular, when the speed exceeds the upper limit, the channel control for calls that newly occured are voluntarily circumvented. With respect to the existing calls, channel control is voluntarily aborted.

Accordingly, accidents which would normally be caused by some operation of a human operator in response to a call that occured while the mobile station is moving at a high speed are prevented efficiently and reliably.

The principle of the second mobile station equipment according to the invention is as follows.

The radio interfacing section 11 forms a radio transmission path between this radio interfacing section 11 and the base station 10 forming a wireless zone. The radio interfacing section 11 transmits and receives information through the radio transmission path. The channel controlling section 12 associates with the base station 10 through the radio interfacing section 11 and through the radio transmission path formed by the radio interfacing section 11, and performs channel control in the wireless zone. The speed monitoring section 13 obtains the speed of the local station. The speed judging section 14 judges whether or not the speed obtained by the speed monitoring section 13 exceeds a predetermined upper limit. When the result of the judgement made by the speed judging section 14 is true, the channel controlling section 12 demands the base station 10 through the radio interfacing section 11 to abort the control of the channels for calls associated with the local station.

The operation of the mobile station equipment constructed as described above is as follows.

The speed monitoring section 13 obtains the speed of the local station, and judges whether or not the speed exceeds a predetermined upper limit.

The channel controlling section 12 associates with the base station 10 through the radio interfacing section 11 and through the radio transmission path formed by the radio interfacing section 11. The channel controlling section 12 performs channel control and demands the base station 10 through the radio interfacing section 11 to abort the channel control for the calls of the local station when the result of the judgement is true.

That is, when the speed exceeds the aforementioned upper limit, the base station 10 is informed of this fact, but the local station does not positively abort the channel control.

Therefore, accidents which would normally be caused by some operation of a human operator in response to a call occurring while the mobile station is moving at a high speed are prevented according to the channel control provided by the base station 10 or the procedure of call processing performed by the exchange connected with this base station 10.

The operation of the third mobile station equipment according to the present invention is as follows.

The radio interfacing section 11 forms a radio transmission path between this radio interfacing section 11 and the base station 10 forming a wireless zone. The radio interfacing section 11 transmits and receives information through the radio transmission path. The channel controlling section 12 associates with the base station 10 through the radio interfacing section 11 and through the radio transmission path formed by the radio interfacing section 11, and performs channel control in the wireless zone. The speed monitoring section 13 obtains the speed of the local station. The channel controlling section 12 informs the base station of the speed obtained by the speed monitoring section 13 through the radio interfacing section 11, obtains the result of the judgement on this speed sent from the radio station 10, and aborts the channel control for calls of the local station when the result of the judgement is true.

The operation of the mobile station equipment of the construction described above is as follows.

The speed monitoring section 13 obtains the speed of the local station. The channel controlling section 12 associates with the base station 10 through the radio interfacing section 11 and through the wireless transmission path formed by the radio interfacing section 11, and performs channel control.

The channel controlling section 12 informs the base station 10 of the speed obtained by the speed monitoring section 13 through the radio interfacing section 11 and through the radio communication path formed by the radio interfacing section 11, obtains the result of the judgement on this speed sent from the base station 10, and aborts the channel control for the calls of the local station when the result of the judgement is true.

Specifically, the judgement whether or not the speed exceeds the predetermined upper limit is made by the base station 10 or by the exchange that performs call processing in association with the base station 10. However, abortion of the channel control in response to the result of the judgement is done by the local station.

Therefore, this channel control is aborted, according to the speed of the local station, when matching to the procedure of either the channel control performed by the base station 10 described above or the call processing performed by the exchange described above.

The principle of the fourth mobile station equipment according to the present invention is as follows.

The radio interfacing section 11 forms a radio transmission path between this radio interfacing section 11 and the base station 10 forming a wireless zone. The radio interfacing section 11 transmits and receives information through the radio transmission path. The channel controlling section 12 associates with the base station 10 through the radio interfacing section 11 and through the radio transmission path formed by the radio interfacing section 11, and performs channel control in the wireless zone. The speed monitoring section 13 obtains the speed of the local station. The channel controlling section 12 transmits the speed obtained by the speed monitoring section 13 to the base station 10 through the radio interfacing section 11.

The operation of the mobile station equipment constructed in this way is as follows.

The speed monitoring section 13 obtains the speed of the local station. The channel controlling section 12 associates with the base station 10 through the radio interfacing section 11 and the radio transmission path formed by the radio interfacing section 11, and performs channel control.

Furthermore, the channel controlling section 12 informs the base station 10 of the speed obtained by the speed monitoring section 13 through the radio interfacing section 11 and through the radio transmission path formed by the radio interfacing section 11.

That is, neither the judgement whether or not the speed of the local station exceeds the predetermined upper limit nor the processing for aborting the channel control when the result of the judgement is true is carried out by the local station. However, the base station 10 is informed of the speed at appropriate timing.

Accordingly, the speed obtained by the speed monitoring section 13 is effectively utilized as a factor for aborting the channel control or call processing by the base station 10 or the exchange while the speed of the local station is higher than the upper limit described above.

The principle of the fifth mobile station equipment according to the present invention is as follows.

The radio interfacing section 11 forms a radio transmission path between this radio interfacing section 11 and the base station 10 forming the wireless zone. The radio interfacing section 11 transmits and receives information through the radio transmission path. The channel controlling section 12 associates with the base station 10 through the radio interfacing section 11 and through the radio transmission path formed by the radio interfacing section 11, and provides channel control in the wireless zone. The speed judging section 14A obtains the speed of the local station given from the base station 10 through the radio interfacing section 11 and through the channel controlling section 12, and judges whether or not the speed exceeds the predetermined upper limit. When the result of the judgement made by the speed judging section 14A is true, the channel controlling section 12 aborts the channel control for calls of the local station.

The operation of the mobile station equipment of the construction described so far is as follows.

The speed judging section 14A obtains the speed of the local station given from the base station 10 through the radio interfacing section 11 and through the channel controlling section 12, and judges whether or not the speed exceeds the predetermined upper limit.

The channel controlling section 12 associates with the base station 10 through the radio interfacing section 11 and through the radio transmission path formed by the radio interfacing section 11, and performs channel control. When the result of the judgement is true, the channel controlling section 12 aborts the channel control regarding calls of the local station.

In particular, the speed used for the judgment of the period for which the mobile station equipment is moving at a high speed is obtained by the base station 10 or the exchange according to standards adapted for channel control or call processing of a call that has occurred or persists within this period.

Accordingly, accidents which would normally be caused by some operation of a human operator in response to a call made during the period described above are prevented more certainly than the first mobile station equipment described above while flexibly adapting itself to the form of channel control or call processing.

The principle of the sixth mobile station equipment according to the present invention is as follows.

The radio interfacing section 11 forms a radio transmission path between the radio interfacing section 11 and the base station 10 forming a wireless zone. The radio interfacing section 11 transmits and receives information through the radio transmission path. The channel controlling section 12 associates with the base station 10 through the radio interfacing section 11 and through the radio transmission path formed by the radio interfacing section 11, and performs channel control of the wireless zone. The speed judging section 14A obtains the speed of the local station given from the base station 10 through the radio interfacing section 11 and through the channel controlling section 12, and judges whether or not the speed exceeds the predetermined upper limit. When the result of the judgement made by the speed judging section 14A is true, the channel controlling section 12 demands the base station 10, through the radio interfacing section 11, to abort the channel control of calls of the local station.

The operation of the mobile station equipment of the construction described above is as follows.

The speed judging section 14A obtains the speed of the local station given from the base station 10 through the radio interfacing section 11 and through the channel controlling section 12, and judges whether or not the speed exceeds the predetermined upper limit. The channel controlling section 12 associates with the base station 10 through the radio interfacing section 11 and through the radio transmission path formed by the radio interfacing section 11, and performs channel control.

Furthermore, the channel controlling section 12 demands the base station 10 to abort the channel control of calls of the local station through the radio interfacing section 11 and through the radio transmission path formed by the radio interfacing section 11 when the result of the judgement made by the speed judging section 14A is true.

That is, the speed of the local station is monitored by either the base station 10 or an exchange associated with the base station 10. However, the judgement whether or not the speed exceeds the aforementioned upper limit is made by the speed judging section 14A.

Accordingly, the channel control or call processing for a call that occurred in the local station is aborted in association with the base station 10 or exchange when the result of the judgement is satisfied.

The principle of the seventh mobile station equipment according to the present invention is as follows.

The radio interfacing section 11 forms a radio transmission path between this radio interfacing section 11 and the base station 10 forming a wireless zone. The radio interfacing section 11 transmits and receives information through the radio transmission path. The channel controlling section 12 associates with the base station 10 through the radio interfacing section 11 and through the radio transmission path formed by the radio interfacing section 11, and performs channel control in the wireless zone. The channel controlling section 12 obtains the result of the judgement whether or not the speed of the local station exceeds the predetermined upper limit from the base station 10 through the radio interfacing section 11. When the result of the judgement is true, the channel controlling section aborts the channel control of calls of the local station.

The operation of the mobile station equipment of the construction described above is as follows.

The channel controlling section 12 associates with the base station 10 through the radio interfacing section 11 and through the radio transmission path formed by the radio interfacing section 11, and performs channel control. The channel controlling section 12 obtains the result of the judgement whether or not the speed of the local station exceeds the predetermined upper limit from the base station 10 through the radio interfacing section 11. When the result of the judgement is true, the channel controlling section 12 aborts the channel control of a call of the local station.

That is, notice that the speed of the local station exceeds the upper limit is given from the base station 10 in accordance with the procedure of the channel control in such a way that the speed of the local station is not monitored nor is the judgement made in the local station.

Therefore, the aforementioned abortion of the channel control is carried out in the local station according to the notice described above without increasing the load on the local station or the size of the hardware substantially.

The principle of the eighth mobile station equipment according to the present invention is as follows.

The radio interfacing section 11 forms a radio transmission path between this radio interfacing section 11 and the base station 10 forming a wireless zone. The radio interfacing section 11 transmits and receives information through the radio transmission path. The channel controlling section 12 associates with the base station 10 through the radio interfacing section 11 and through the radio transmission path formed by the radio interfacing section 11, and performs channel control in the wireless zone. A relaying section 15 mutually relays between the base station 10, on all or part of the speeds of the local stations or other mobile stations, difference between the speeds and the predetermined upper limit, and a origination request for aborting the channel control or call processing performed by the base station 10 through the interfacing section 11.

The operation of the mobile station equipment of the construction described above is as follows.

The radio interfacing section 11 forms a radio transmission path between this radio interfacing section 11 and the base station 10 forming a wireless zone. The radio interfacing section 11 transmits and receives information through the radio transmission path. The channel controlling section 12 associates with the base station 10 through the radio interfacing section 11 and through the radio transmission path formed by the radio interfacing section 11, and performs channel control in the wireless zone.

The relaying section 15 mutually relays between the base station 10, on all or part of the speeds of a local station or other mobile stations, the difference between the speeds and the predetermined upper limit, and a demand for aborting the channel control or call processing performed by the base station 10 through the radio interfacing section 11.

That is, the mobile station equipment associates with the base station 10 to abort the channel control or call processing associated with calls of mobile stations whose speeds exceed the upper limit without monitoring the speed of the local station or other mobile stations making a judgement whether the speed exceeds the upper limit described above, and aborting the channel control in response to the result of the judgement at the local station.

Accordingly, either or both of functions and/or load is distributed in a desired manner between the base station 10 and the exchange associating with the base station 10 to perform call processing.

Figure 2:
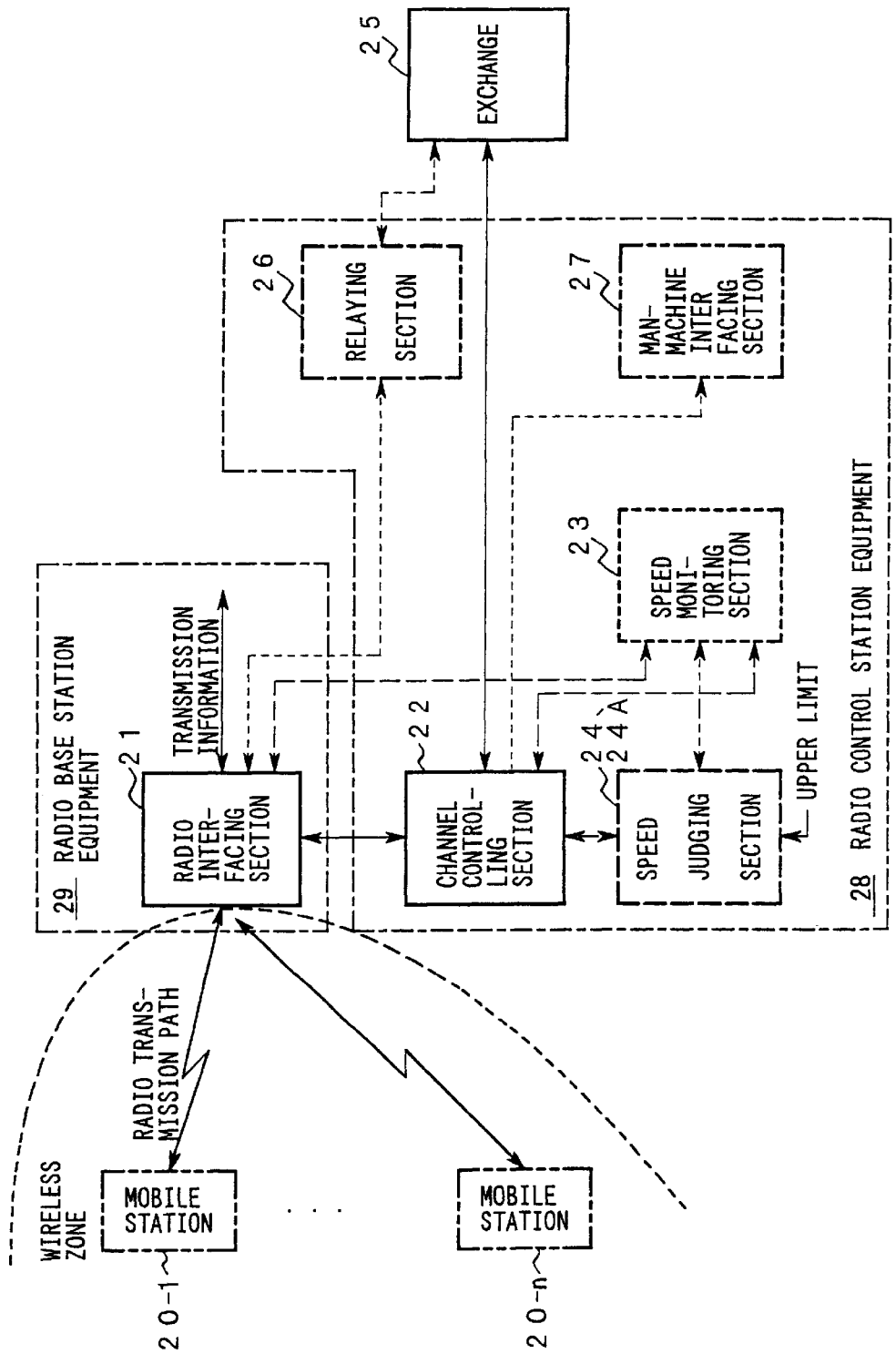
FIG. 2 is a block diagram illustrating the principle of a base station equipment according to the invention.

FIG. 2 is a block diagram illustrating the principle of base station equipment according to the present invention.

The principle of the first base station equipment according to the invention is as follows.

A radio interfacing section 21 forms a wireless zone where mobile stations 20-1 to 20-n are located. The radio interfacing section 21 forms radio transmission paths between the radio interfacing section 21 and the mobile stations 20-1 to 20-n, and transmits and receives information, through the radio transmission paths. A channel controlling section 22 associates with the mobile stations 20-1 to 20-n through the radio interfacing section 21 to control the channels in the wireless zone. A speed monitoring section 23 obtains the speeds of individual mobile stations of the mobile stations 20-1 to 20-n which are accessing to the radio transmission paths formed by the radio interfacing section 21 under the channel control of the channel controlling section 22. A speed judging section 24 judges whether or not the speeds obtained by the speed monitoring section 23 exceed the predetermined upper limit. The channel controlling section 22 aborts the channel control of calls of those mobile stations having speeds which have been judged to be true by the speed judging section 24.

The operation of the base station equipment of the construction described above is as follows.

The speed monitoring section 23 obtains the speeds of individual mobile stations of the mobile stations 20-1 to 20-n which are accessing to the radio transmission paths formed by the radio interfacing section 21 under the channel control of the channel controlling section 22. The speed judging section 24 judges whether or not the speeds exceed the predetermined upper limit.

The channel controlling section 22 associates with the mobile stations 20-1 to 20-n through the radio interfacing section 21 to thereby perform channel control of the wireless zone formed by the local station. Furthermore, the channel controlling section 22 aborts the channel control of calls that occurred in those mobile stations speeds of which are judged to be true by the speed judging section 24.

In particular, with respect to the mobile stations having speeds exceeding the aforementioned upper limit, the base station equipment voluntarily refrains from channel control on newly occured calls. Similarly, the base station equipment voluntarily aborts channel control on existing calls.

Accordingly, accidents which would normally be caused by some operation of a human operator in response to a call that occured while the mobile station is moving at a high speed are prevented without making any change to the structure of this mobile station.

The principle of the second base station equipment according to the present invention is as follows.

A radio interfacing section 21 forms a wireless zone where mobile stations 20-1 to 20-n are located. The radio interfacing section 21 forms radio transmission paths between the radio interfacing section 21 and the mobile stations 20-1 to 20-n, and transmits and receives information, through the radio transmission paths. A channel controlling section 22 associates with the mobile stations 20-1 to 20-n through the radio interfacing section 21 to control the channels in the wireless zone. A speed monitoring section 23 obtains the speeds of individual mobile stations of the mobile stations 20-1 to 20-n which are accessing to the radio transmission paths formed by the radio interfacing section 21 under the channel control of the channel controlling section 22. A speed judging section 24 judges whether or not the speeds obtained by the speed monitoring section 23 exceed the predetermined upper limit. With respect to calls of the mobile stations moving at speeds that have been obtained to be true by the judgements made by the speed judging section 24, the channel controlling section 22 demands these mobile stations to abort the channel control through the radio interfacing section 21 and through the wireless zone formed by the radio interfacing section or demands the exchange 25 to abort the call processing.

The operation of the base station equipment of the construction described above is as follows.

The speed monitoring section 23 obtains the speeds of individual mobile stations of the mobile stations 20-1 to 20-n which are accessing to the radio transmission paths formed by the radio interfacing section 21 under the channel control of the channel controlling section 22. The speed judging section 24 judges whether or not the speeds exceed the predetermined upper limit.

The channel controlling section 22 associates with the mobile stations 20-1 to 20-n through the radio interfacing section 21 to perform channel control. With respect to calls of the mobile stations speeds of which have been obtained to be true by the judgements made by the speed judging section 24, the channel controlling section 22 demands these mobile stations to abort the channel control through the radio interfacing section 21 and through the radio transmission paths formed by the radio interfacing section 21 or demands the exchange 25 to abort the call processing.

That is, with respect to mobile stations moving at speeds exceeding the aforementioned upper limit, the mobile stations or exchange 25 is informed of this fact. However, at the local station, the channel control is not voluntarily aborted.

Accordingly, accidents which would normally be caused by some operation of a human operator in response to a call that occurred while the mobile station is moving at a high speed are prevented according to the channel control performed by this mobile station or on the procedure adapted to the call processing performed by the exchange 25.

The principle of the third base station equipment according to the present invention is as follows.

A radio interfacing section 21 forms a wireless zone where mobile stations 20-1 to 20-n are located. The radio interfacing section 21 forms radio transmission paths between the radio interfacing section 21 and the mobile stations 20-1 to 20-n, and transmits and receives information, through the radio transmission paths. A channel controlling section 22 associates with the mobile stations 20-1 to 20-n through the radio interfacing section 21 to control the channels in the wireless zone. A speed monitoring section 23 obtains the speeds of individual mobile stations of the mobile stations 20-1 to 20-n which are accessing to the radio transmission paths formed by the radio interfacing section 21 under the channel control of the channel controlling section 22. The channel controlling section 22 informs those of the mobile stations having speeds obtained by the speed monitoring section 23 or the exchange 25 of the speeds, obtains the results of the judgements on these speeds sent from the mobile stations or exchange 25, and abort the channel control of calls of the mobile stations moving at speeds judged to be true.

The operation of the base station equipment of the construction described above is as follows.

The speed monitoring section 23 finds the speeds of individual mobile stations of the mobile stations 20-1 to 20-n which are accessing to the radio transmission paths formed by the radio interfacing section 21 under the channel control of the channel controlling section 22. The channel controlling section 22 associates with the mobile stations 20-1 to 20-n through the radio interfacing section 21 to perform channel control, and informs those of the mobile stations having speed obtained by the speed monitoring section 23 or the exchange of the speeds.

The channel controlling section 22 obtains the results of judgements on the speeds given from the mobile stations or exchange 25 and aborts the channel control of calls that occurred in mobile stations moving at speeds judged to be true as results of the judgements.

That is, the judgement whether or not the speeds obtained by the speed monitoring section 23 exceed the given upper limit is made either by the mobile stations for which the speeds were measured speeds or by the exchange 25. However, the abortion of the channel control in response to the results of the judgements is carried out by the local station.

Accordingly, with respect to the abortion of the channel control as described above, it is carried out for any mobile station at the moment the procedure of the channel control performed by the corresponding mobile stations or the procedure of call processing performed by the exchange 25 is matched, as well as the speeds.

The principle of the fourth base station equipment according to the present invention is as follows.

A radio interfacing section 21 forms a wireless zone where mobile stations 20-1 to 20-n are located. The radio interfacing section 21 forms radio transmission paths between the radio interfacing section 21 and the mobile stations 20-1 to 20-n, and transmits and receives information, through the radio transmission paths. A channel controlling section 22 associates with the mobile stations 20-1 to 20-n through the radio interfacing section 21 to control the channels in the wireless zone. A speed monitoring section 23 obtains the speeds of individual mobile stations of the mobile stations 20-1 to 20-n which are accessing to the radio transmission paths formed by the radio interfacing section 21 under the channel control of the channel controlling section 22. The channel controlling section 22 informs those of the mobile stations having speeds obtained by the speed monitoring section 23 or the exchange 25 of the speeds.

The operation of the base station equipment of the construction described above is as follows.

The speed monitoring section 23 obtains the speeds of individual mobile stations, of the mobile stations 20-1 to 20-n, which are accessing to the radio transmission paths formed by the radio interfacing section 21 under the channel control of the channel controlling section 22. The channel controlling section 22 associates with the mobile stations 20-1 to 20-n through the radio interfacing section 21 to provide channel control, and informs those of the mobile stations having speeds obtained by the speed monitoring section 23 or the exchange of the speeds.

That is, neither the judgement whether or not the speed obtained by the speed monitoring section 23 exceeds the predetermined upper limit nor the processing for aborting the channel control or call processing associated with the corresponding mobile stations when the result of the judgement is true is carried out by the local station. However, the mobile stations or exchange 25 is informed appropriately of the speeds.

Accordingly, the speeds obtained by the speed monitoring section 23 are effectively utilized by the mobile stations or exchange 25 that abort the channel control or call processing during periods for which the speeds exceed the upper limit.

The principle of the fifth base station equipment according to the present invention is as follows.

A radio interfacing section 21 forms a wireless zone where mobile stations 20-1 to 20-n are located. The radio interfacing section 21 forms radio transmission paths between the radio interfacing section 21 and the mobile stations 20-1 to 20-n, and transmits and receives information, through the radio transmission paths. A channel controlling section 22 associates with the mobile stations 20-1 to 20-n through the radio interfacing section 21 to control the channels in the wireless zone. A speed judging section 24A obtains individual speeds given from the mobile stations 20-1 to 20-n through the radio interfacing section 21 and the channel controlling section 22 or individual speeds of these mobile stations 20-1 to 20-n given from the exchange 25 through the channel controlling section 22, and judges whether or not these speeds exceed the predetermined upper limit, respectively. The channel controlling section 22 aborts the channel control of calls of those of mobile stations 20-1 to 20-n moving at speeds judged to be true as results of judgements made by the speed judging section 24A.

The operation of the base station equipment of the construction described above is as follows.

The speed judging section 24A obtains individual speeds given from the mobile stations 20-1 to 20-n through the radio interfacing section 21 and the channel controlling section 22 or individual speeds of these mobile stations 20-1 to 20-n given from the exchange 25, and judges whether or not these speeds exceed the predetermined upper limit, respectively.

The channel controlling section 22 associates with the mobile stations 20-1 to 20-n through the radio interfacing section 21 to thereby perform channel control. Furthermore, the channel controlling section 22 aborts the channel control of calls of those mobile stations of the mobile stations, 20-1 to 20-n, having speeds which have been judged to be true in the judgements described above.

In particular, the speed used for the judgment of the period in which the mobile station equipment is moving at a high speed is obtained based on standards adapted for the channel control performed by the mobile station equipment and for the call processing performed by the exchange 25 for calls made or persisting during this period.

Accordingly, accidents which would normally be caused by some operation of a human operator in response to a call that occurred during the period described above are prevented more certainly than the first mobile station equipment described above while flexibly adapting itself to the form of channel control or call processing.

The principle of the sixth base station equipment according to the present invention is as follows.

A radio interfacing section 21 forms a wireless zone where mobile stations 20-1 to 20-n are located. The radio interfacing section 21 forms radio transmission paths between the radio interfacing section 21 and the mobile stations 20-1 to 20-n, and transmits and receives information, through the radio transmission paths. A channel controlling section 22 associates with the mobile stations 20-1 to 20-n through the radio interfacing section 21 to control the channels in the wireless zone. A speed judging section 24A obtains individual speeds given from the mobile stations 20-1 to 20-n through the radio interfacing section 21 and the channel controlling section 22 or speeds of these mobile stations 20-1 to 20-n given from the exchange 25 through the channel controlling section 22, and judges whether or not these speeds exceed the predetermined upper limit, respectively. With respect to calls of those of mobile stations 20-1 to 20-n moving at speeds that have been obtained to be true by judgements made by the speed judging section 24A, the channel controlling section 22 demands the mobile stations to abort the channel control through the radio interfacing section 21 or demands the exchange 25 to abort the call processing.

The operation of the base station equipment of the construction described above is as follows.

The speed judging section 24A obtains individual speeds given from the mobile stations 20-1 to 20-n through the radio interfacing section 21 and the channel controlling section 22 or individual speeds of these mobile stations 20-1 to 20-n given from the exchange 25 through the channel controlling section 22, and judges whether or not these speeds exceed the predetermined upper limit, respectively. The channel controlling section 22 associates with the mobile stations 20-1 to 20-n through the radio interfacing section 21 to perform channel control.

With respect to calls of the mobile station, of mobile stations 20-1 to 20-n, moving at speeds that have been obtained to be true by the aforementioned judgements, the channel controlling section 22 demands the mobile stations to abort the channel control through the radio interfacing section 21 or demands the exchange 25 to abort the call processing.

That is, the speeds of the mobile stations 20-1 to 20-n are monitored by the mobile stations 20-1 to 20-n, respectively, or by the exchange 25. Judgements whether or not these speeds are respectively in excess of the above-described upper limit are made by the speed judging section 24A.

Accordingly, channel control or call processing associated with calls of mobile stations having speeds exceeding the upper limit described above is aborted in association with the mobile stations or the exchange 25 at the moment the results of the judgements are matched.

The principle of the seventh base station equipment according to the present invention is as follows.

A radio interfacing section 21 forms a wireless zone where mobile stations 20-1 to 20-n are located. The radio interfacing section 21 forms radio transmission paths between the radio interfacing section 21 and the mobile stations 20-1 to 20-n, and transmits and receives information, through the radio transmission paths. A channel controlling section 22 associates with the mobile stations 20-1 to 20-n through the radio interfacing section 21 to control the channels in the wireless zone. The channel controlling section 22 obtains the results of the judgements given through the radio interfacing section 21 or from the exchange 25 and indicating whether the individual speeds of the mobile stations 20-1 to 20-n exceed the predetermined upper limit, and aborts the channel control of calls of mobile stations judged to be true by the judgements.

The operation of the base station equipment of the construction described above is as follows.

The channel controlling section 22 associates with the mobile stations 20-1 to 20-n through the radio interfacing section 21 to perform channel control.

Furthermore, the channel controlling section 22 obtains results of judgements whether or not the individual speeds of the mobile stations 20-1 to 20-n exceed a given upper limit, the results being given through the radio interfacing section 21 or from the exchange 25.

In addition, the channel controlling section 22 aborts channel control regarding calls of mobile stations having speeds judged to be true by the judgements.

That is, notice that the aforementioned upper limit is exceeded is given by the corresponding mobile stations or to the exchange 25 according to the procedure of the channel control without monitoring the individual speeds of the mobile stations 20-1 to 20-n or making the above-described judgements.

Therefore, the aforementioned abort of the channel control is carried out at the local station according to the procedure of the channel control performed by the local station without increasing the load on the local station or the size of the hardware substantially.

The principle of the eighth base station equipment according to the present invention is as follows.

A radio interfacing section 21 forms a wireless zone where the mobile stations 20-1 to 20-n are located. The radio interfacing section 21 forms radio transmission paths between the radio interfacing section 21 and the mobile stations 20-1 to 20-n, and transmits and receives information, through the radio transmission paths. A channel controlling section 22 associates with the mobile stations 20-1 to 20-n through the radio interfacing section 21 to control the channels in the wireless zone described above. A relaying section 26 mutually relays between the exchange 25, on all or part of the speeds of the mobile stations 20-1 to 20-n, difference between the speeds and the predetermined upper limit, and a origination request for aborting the channel control or call processing -performed by the exchange 25.

The operation of the base station equipment of the construction described above is as follows.

The radio interfacing section 21 forms a wireless zone. The radio interfacing section 21 forms radio transmission paths between the radio interfacing section 21 and the mobile stations 20-1 to 20-n which are located in the wireless zone, and transmits and receives transmission information, through the radio transmission paths. The channel controlling section 22 associates with the mobile stations 20-1 to 20-n through the radio interfacing section 21 perform control to control in the wireless zone described above.

A relaying section 26 mutually relays between the exchange 25, on all or part of the speeds of the mobile stations 20-1 to 20-n, difference between the speeds and the predetermined upper limit, and a origination request for aborting the channel control or call processing performed by the exchange 25.

In particular, without monitoring the speeds of the mobile stations 20-1 to 20-n, making judgements whether or not these speeds exceed the aforementioned upper limit, and aborting the channel control in response to the results of the judgements, the mobile stations that have speeds exceeding the upper limit associate with the exchange 25 in such a processing that is needed for aborting of the channel control or call processing.

Accordingly, either or both of functions and/or load is distributed in a desired manner between the mobile stations 20-1 to 20-n and the exchange 25.

Figure 3:
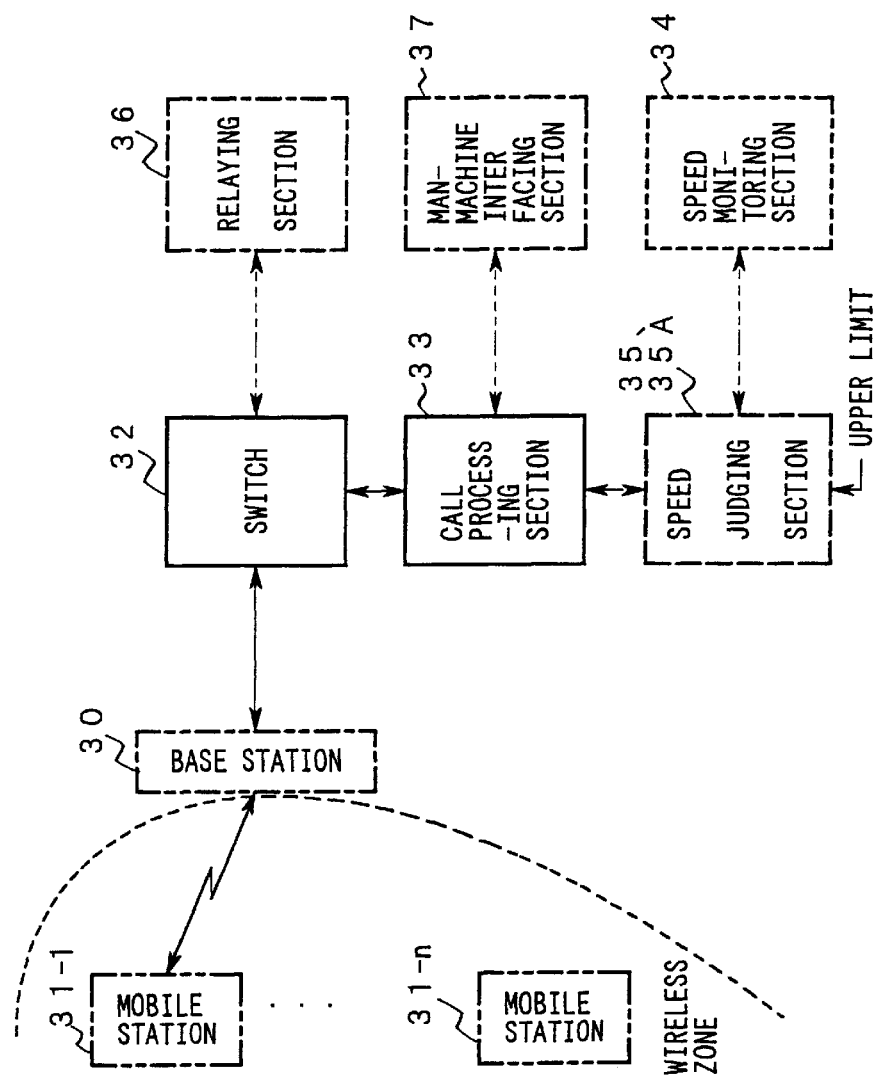
FIG. 3 is a block diagram illustrating the principle of an exchange according to the invention.

FIG. 3 is a block diagram illustrating the principle of an exchange according to the present invention.

The principle of the exchange according to the present invention is hereinafter described by referring to FIG. 3.

The principle of the first exchange according to the invention is as follows.

A switch 32 is connected with a base station 30 through a communication link. In response to a command given from the outside, the switch forms a speech path used for providing communication services to mobile stations 31-1 to 31-n located within a wireless zone formed by the base station 30. A call processing section 33 performs call processing regarding calls made by the mobile stations 31-1 to 31-n and gives instructions adapted for the procedure of the call processing to the switch 32. A speed monitoring section 34 obtains the speeds of the mobile stations, respectively, of the mobile stations 31-1 to 31-n make calls to be processed by the call processing performed by the call processing section 33. A speed judging section 35 judges whether or not the speeds obtained by the speed monitoring section 34 exceed a predetermined upper limit.

The call processing section 33 aborts the call processing regarding calls of mobile stations judged to be true by the speed judging section 35.

The operation of the exchange of the construction described above is as follows.

The speed monitoring section 34 obtains the speeds of the mobile stations, respectively, of the mobile stations 31-1 to 31-n located within the wireless zone formed by the base station 30, in which calls to be call processed by the call processing section 33 have occurred. The speed judging section 35 judges whether or not these speeds exceed the predetermined upper limit.

The call processing section 33 performs call processing regarding calls that occurred in the mobile stations 31-1 to 31-n and gives instructions adapted for the procedure of the call processing to the switch, and aborts the call processing regarding calls of mobile stations judged to be true by the speed judging section 35.

That is, with respect to the mobile stations having speeds exceeding the above-described upper limit, the exchange voluntarily refrains from call processing regarding newly occurred calls. With respect to already existing calls, call processing is similarly aborted voluntarily.

Accordingly, accidents which would normally be caused by some operation of a human operator in response to a call that occurred while the mobile station is moving at a high speed are prevented without making any change to the structure of this mobile station and to the structure of the base station 30.

The principle of the second exchange according to the present invention is as follows.

A switch 32 is connected with a base station 30 through a communication link. In response to a command given from the outside, the switch forms a speech path used for providing communication services to mobile stations 31-1 to 31-n located within a wireless zone formed by the base station 30. A call processing section 33 performs call processing regarding calls occurring at mobile stations 31-1 to 31-n, and gives instructions adapted for the procedure of the call processing to the switch 32. A speed monitoring section 34 obtains the speeds of those of the mobile stations 31-1 to 31-n that make calls to be processed by the call processing performed by the call processing section 33. A speed judging section 35 judges whether or not the speeds obtained by the speed monitoring section 34 exceed a predetermined upper limit. The call processing section 33 demands the base station 30 through the switch 32 to abort control the channel regarding calls of those of the mobile stations judged to be true by the speed judging section 35.

The operation of the exchange of the structure described above is as follows.

The speed monitoring section 34 obtains the speeds of the mobile stations, respectively, of the mobile stations 31-1 to 31-n, that make calls to be call processed by the call processing section 33 have occured. The speed judging section judges whether or not the speeds exceed a predetermined upper limit.

The call processing section 33 performs processing regarding calls occurring at the mobile stations 31-1 to 31-n, gives an instruction adapted for the procedure of the call processing to the switch 32, and demands the base station 30 through the switch 32 to abort the channel controlling regarding calls of the mobile stations judged to be true by the speed judging section 35.

That is, with respect to the mobile stations having speeds exceeding the aforementioned upper limit, the base station 30 or this mobile station 30 is informed of this fact. However, the call processing is not voluntarily suspended at the local station.

Therefore, accidents which would normally be caused by some operation of a human operator on a mobile station moving at a high speed in response to a call occurring at the mobile station can be prevented according to a procedure adapted for channel control exerted by the base station 30 or the mobile station 30.

The principle of the third exchange according to the present invention is as follows.

A switch 32 is connected with a base station 30 through a communication link. In response to a command given from the outside, the switch forms a speech path used for providing communication services to mobile stations 31-1 to 31-n located within a wireless zone formed by the base station 30. A call processing section 33 performs call processing regarding calls occurring at mobile stations 31-1 to 31-n and gives instructions adapted for the procedure of the call processing to the switch 32. A speed monitoring section 34 obtains the speeds of the mobile stations, respectively, of the mobile station 31-1 to 31-n that make calls to be processed by the call processing performed by the call processing section 33. The call processing section 33 informs, through the switch 32, those of the mobile stations having speeds obtained by the speed monitoring section 34 of the speeds. The call processing section 33 obtains the results of the judgements whether or not the speeds of the stations sent from the base station 30 exceed the predetermined upper limit, and aborts call processing regarding calls of mobile stations moving at speeds judged to be true by the judgements.

The operation of the exchange of the structure described above is as follows.

The speed monitoring section 34 obtains the speeds of the mobile stations, respectively, of the mobile stations 31-1 to 31-n, occurring calls to be call processed by the call processing section 33. The call processing section 33 performs processing regarding these calls and gives an instruction adapted for the procedure of the call processing to the switch 32. Furthermore, with respect to mobile stations having speeds obtained by the speed monitoring section 34, the call processing section 33 informs the base station 30 of the speeds through the switch 32.

Additionally, the call processing section 33 obtains the results of the judgements whether or not the speeds exceed the predetermined upper limit, and aborts the call processing regarding calls of the mobile stations moving at speeds judged to be true by the judgements.

That is, the judgements whether or not the speeds obtained by the speed monitoring section 34 exceed the predetermined upper limit are made by the mobile stations moving at those speeds or by the base station 30. The channel control in response to the results of the judgements is aborted at the local station.

Therefore, the abortion of the channel control as described above is carried out for any mobile station at the moment the procedure of the channel control performed by the corresponding mobile stations or the base station 30 is matched, as well as the speed.

The principle of the fourth exchange according to the resent invention is as follows.

A switch 32 is connected with a base station 30 through a communication link. In response to a command given from the outside, the switch forms a speech path used for providing communication services to mobile stations 31-1 to 31-n located within a wireless zone formed by the base station 30. A call processing section 33 performs call processing regarding calls made by the mobile stations 31-1 to 31-n and gives instructions adapted for the procedure of the call processing to the switch 32. A speed monitoring section 34 obtains the speeds of the mobile stations, respectively, of the mobile stations 31-1 to 31-n that make calls to be processed by the call processing performed by the call processing section 33. The call processing section 33 informs, through the switch 32, the base station 30 of the speeds obtained by the speed monitoring section 34.

The operation of the exchange of the structure described above is as follows.

The speed monitoring section 34 obtains the speeds of the mobile stations, of the mobile stations 31-1 to 31-n, that calls to be processed by the call processing section 33 have occurred. The call processing section 33 performs processing regarding these calls and gives an instruction adapted for the procedure of the call processing to the switch 32.

Furthermore, with respect to the mobile stations which have speeds obtained by the speed monitoring section 34, the call processing section 33 informs the base station 30 of the speeds through the switch 32.

Specifically, neither the judgements whether or not the speeds obtained by the speed monitoring section 34 exceed the predetermined upper limit nor abort of the channel control or call processing regarding mobile stations moving at speeds judged to be true by the judgements is carried out by the local station. However, the base station 30 is appropriately informed of the speeds.

Consequently, the speeds obtained by the speed monitoring section 34 are effectively utilized by the base station 30 that should abort the channel control during a period for which the speeds exceed the upper limit.

The principle of the fifth exchange according to the present invention is as follows.

A switch 32 is connected with a base station 30 through a communication link. In response to a command given from the outside, the switch forms a speech path used for providing communication services to mobile stations 31-1 to 31-n located within a wireless zone formed by the base station 30. A call processing section 33 performs call processing regarding calls made by the mobile stations 31-1 to 31-n and gives instructions adapted for the procedure of the call processing to the switch 32. A speed judging section 35A obtains the individual speeds of the mobile stations 31-1 to 31-n given from the base station through the switch 32 and through the call processing section 33, and judges whether or not these speeds exceed the predetermined upper limit, respectively. The call processing section 33 aborts the call processing concerning calls of mobile stations having speeds judged to be true by the judgements made by the speed judging section 35A.

The operation of the exchange of the structure described above is as follows.

The speed judging section 35A obtains the individual speeds of the mobile stations 31-1 to 31-n given from the base station 30 through the switch 32 and the call processing section 33, and judges whether or not these speeds exceed the predetermined upper limit, respectively.

The call processing section 33 performs call processing regarding calls occurring in the mobile stations 31-1 to 31-n and gives instructions adapted for the procedure of the call processing to the switch 32, and aborts the call processing concerning calls occurring in the mobile stations, of the mobile stations 31-1 to 31-n, having speeds judged to be true by the judgements described above.

In particular, the speed used for the judgment of the period for which the mobile station equipment is moving at a high speed is obtained based on standards adapted for the channel control performed by the mobile stations or base station regarding calls which will occur or be persisting during the period.

Accordingly, accidents which would normally be caused by some operation of a human operator of mobile station equipment in response to a call that occurred during the period described above are prevented more certainly than the first mobile station equipment described above while flexibly adapting itself to the form of channel control.

The principle of the sixth exchange according to the present invention is as follows.

A switch 32 is connected with a base station 30 through a communication link. In response to a command given from the outside, the switch forms a speech path used for providing communication services to mobile stations 31-1 to 31-n located within a wireless zone formed by the base station 30. A call processing section 33 performs call processing regarding calls made by the mobile stations 31-1 to 31-n and gives instructions adapted for the procedure of the call processing to the switch 32. A speed judging section 35A obtains the individual speeds of the mobile stations 31-1 to 31-n given from the base station through the switch 32 and through the call processing section 33, and judges whether or not these speeds exceed the predetermined upper limit, respectively. The call processing section 33 demands, through the switch 32, the base station to abort the channel control concerning calls of mobile stations 31-1 to 31-n having speeds judged to be true by the judgements made by the speed judging section 35A.

The operation of the exchange of the structure described above is as follows.

The speed judging section 35A obtains the individual speeds of the mobile stations 31-1 to 31-n given from the base station 30 through the switch 32 and the call processing section 33, and judges whether or not these speeds exceed the predetermined upper limit, respectively. The call processing section 33 performs call processing regarding calls occurring at the mobile stations 31-1 to 31-n and gives instructions adapted for the procedure of the call processing to the switch 32.

Furthermore, the call processing section 33 demands, through the switch 32, the base station 30 to abort the channel control concerning calls that have occurred in the mobile stations, of the mobile stations 31-1 to 31-n, having speeds judged to be true by the judgements made by the speed judging section 35A.

In particular, the speeds of the mobile stations 31-1 to 31-n are monitored by these mobile stations 31-1 to 31-n, respectively, or by the base station 30. However, judgements whether or not these speeds exceed the upper limit described above are made by the speed judging section 35A, respectively.

Accordingly, the call processing regarding mobile stations having speeds exceeding the upper limit is aborted in association with the mobile stations or the base station at the moment the results of the judgements are matched.

The principle of the seventh exchange according to the present invention is as follows.

A switch 32 is connected with a base station 30 through a communication link. In response to a command given from the outside, the switch forms a speech path used for providing communication services to mobile stations 31-1 to 31-n located within a wireless zone formed by the base station 30. A call processing section 33 performs call processing regarding calls made by the mobile stations 31-1 to 31-n and gives instructions adapted for the procedure of the call processing to the switch 32. Furthermore, the call processing section 33 obtains the results of the judgements made whether or not the speeds of the mobile stations 31-1 to 31-n exceed the predetermined upper limit from the base station 30 through the switch 32, and aborts the call processing concerning calls of mobile stations having speeds judged to be true by the judgements.

The operation of the exchange of the structure described above is as follows.

The call processing section 33 performs call processing regarding calls occurring at the mobile stations 31-1 to 31-n, and gives an instruction adapted for the procedure of the call processing to the switch 32.

Furthermore, the call processing section 33 obtains the results, given from the base station 30 through the switch 32, of the judgements whether or not the speeds of the mobile stations 31-1 to 31-n exceed the predetermined upper limit.

In addition, the call processing section 33 aborts the call processing regarding calls of the mobile stations having speeds judged to be true.

In particular, with respect to the individual speeds of the mobile stations 31-1 to 31-n, without monitoring or making the judgement, note that the individual speeds exceed the upper limit described above is given by the corresponding mobile stations or the base station 30 according to the procedure of the channel control.

Accordingly, the channel control is aborted according to the procedure of the channel control performed by the local station in response to the aforementioned notice without increasing the load on the local station or the size of the hardware greatly.

The principle of the eighth exchange according to the present invention is as follows.

A switch 32 is connected with a base 'station 30 through a communication link. In response to a command given from the outside, the switch forms a speech path used for providing communication services to mobile stations 31-1 to 31-n located within a wireless zone formed by the base station 30. A call processing section 33 performs call processing regarding calls made by the mobile stations 31-1 to 31-n, and gives instructions adapted for the procedure of the call processing to the switch 32. A relaying section 36 mutually relays between the base station 30, on all or part of the speeds of the mobile stations 31-1 to 31-n, difference between the speeds and the predetermined upper limit, and a origination request for aborting the channel control or call processing performed by the base station 30.

The operation of the exchange of the construction described above is as follows.

The call processing section 33 performs call processing regarding calls occurring in the mobile stations 31-1 to 31-n, and gives instructions adapted for the procedure of the call processing to the switch 32. According to the instructions, the switch 32 forms a speech path used for providing communication services to mobile stations 31-1 to 31-n located within a wireless zone formed by the base station 30.

The relaying section 36 mutually relays between the base station 30, on all or part of the speeds of the mobile stations 31-1 to 31-n, difference between the speeds and the predetermined upper limit, and a origination request for aborting the channel control or call processing performed by the base station 30.

In particular, without monitoring the speeds of the mobile stations 31-1 to 31-n, making judgements whether or not these speeds exceed the aforementioned upper limit, and aborting the channel control in response to the results of the judgements, of the mobile stations that have speeds exceeding the upper limit in association with the base station 30 in such a processing to abort the channel control or call processing, is carried out.

Accordingly, both or either of functions and load is distributed in a desired manner between the mobile stations 31-1 to 31-n and the base station 30.

The principle of the ninth mobile equipment according to the present invention is as follows.

A speed monitoring section 13 monitors the transmission quality of receiving waves arriving from a base station 10 to a radio interfacing section 11, and obtains the speed of the local station as a converted value of the frequency of deterioration of the transmission quality.

In the mobile station equipment of this construction, the speed of the mobile station equipment is obtained according to the receiving waves that reached from the base station 10.

Therefore, the size of the hardware is suppressed greatly compared with the case where there is provided a dedicated section for obtaining the speeds.

The principle of the tenth mobile station equipment according to the present invention is as follows.

A speed monitoring section 13 obtains the position of the local station according to either radio navigation or self-contained navigation, and determines the speed of the local station as a rate of change of the position.

In the mobile station equipment of the construction described above, the speed of the mobile station equipment is obtained even if the transmission quality of receiving waves that reached from a radio base station 10 is quite poor as long as the speed monitoring section 13 operates normally according to the aforementioned radio navigation or self-contained navigation.

Therefore, a state in which the mobile station equipment is moving at a high speed and thus the channel control should be aborted can be recognized with high accuracy.

The principle of the ninth base station equipment according to the present invention is as follows.

A speed monitoring section 23 monitors the transmission quality of receiving waves arriving at a radio interfacing section 21 for each mobile station, and obtains the speed as a converted value of the frequency of deterioration of the transmission quality.

In the base station equipment of the structure described above, the speeds of the mobile stations are obtained according to the receiving waves that reached from the mobile stations and so the size of the hardware is decreased greatly compared with the case where there is a dedicated section for obtaining the speeds.

The principle of the ninth exchange according to the present invention is as follows.

A speed monitoring section 34 monitors the transmission quality of the communication link formed between each mobile station and a switch 32 through a base station 30, and determines the speed as a converted value of the frequency of deterioration of the transmission quality.

In the exchange of the construction described above, the speeds of the individual mobile stations are obtained according to the receiving waves reaching the base station 30 from these mobile stations and so the size of the hardware is reduced greatly compared with the case where there is a dedicated section for obtaining the speeds.

The principle of the eleventh mobile station equipment according to the present invention is as follows.

The man-machine interfacing section 16 provides a man-machine interface associated with notice that the channel control is aborted by a channel controlling section 12.

In the mobile station equipment of the construction described above, the operator can recognize that the reason why any one of origination, terminating, and location updating is restricted, or why conversation has been compulsorily aborted is the high-speed movement of the local station.

The principle of the tenth base station equipment according to the present invention is as follows.

A man-machine interfacing section 27 provides a man-machine interface associated with at least one of a first kind of notice that a mobile station whose channel control is aborted by a channel controlling section 22 and a second kind of notice that the channel control is aborted.

In the base station equipment of this construction, a personnel in charge of maintenance and operation for this base station equipment can recognize a mobile station and the existence of the mobile station whose any one of origination, terminating, and location updating is restricted due to high-speed movement and in which conversation has been compulsorily aborted.

The principle of the tenth exchange according to the present invention is as follows.

A man-machine interfacing section 37 provides a man-machine interface associated with at least one of a first kind-of notice of a mobile station where call processing has been aborted by a call processing section 33 and a second kind of notice that the call processing has been aborted.

In the exchange of this construction, personnel in charge of maintenance and operation for this base station equipment for this exchange can recognize a mobile station and the existence of the mobile station whose any one of origination, terminating, and location updating is restricted due to high-speed movement and in which conversation has been compulsorily aborted.

The principle of the eleventh exchange according to the present invention is as follows.

A call processing section 33 limits calls for which call processing should be aborted to calls adapted for at least one of service classes of originating party and terminating party.

In the exchange of this construction, the possibility that originating calls and termination calls are restricted or these calls are compulsorily cleared for the reason that call processing is aborted irrespective of the service class of the originating or terminating party is eliminated.

The principle of the twelfth mobile station equipment according to the present invention is as follows.

A channel controlling section 12 keeps information necessary to continue or retrial the channel control to be aborted, and continues or retrials the channel control by utilizing the information when the result of a judgement that led to abortion of the channel control changes from true back to false.

With the mobile station equipment of this construction, a calling party or called party of the call which was restricted for the reason that the speed of the mobile station equipment, that is a calling or called party, is great can easily converse without cumbersome operations associated with re-origination or callback when the speed becomes lower than the upper limit.

The principle of the eleventh base station equipment according to the present invention is as follows.

A channel controlling section 22 keeps information necessary to continue or retrial the channel control to be aborted, and continues or retrials the channel control by utilizing the information when the result of a judgement that led to abortion of the channel control changes from true back to false.

With the base station equipment of this construction, a calling party or called party of the call which was restricted for the reason that the speed of the mobile station equipment, that is a calling or called party, is great can easily converse without cumbersome operations associated with re-origination or callback when the speed becomes lower than the upper limit.

The principle of the twelfth exchange according to the present invention is as follows.

A call processing section 33 keeps information necessary to continue or retrial the channel control to be aborted, and continues or retrials the channel control by utilizing the information when the result of a judgement that led to abortion of the channel control returns from true to false.

With the exchange of this construction, a calling party or called party of the call which was restricted for the reason that the speed of the mobile station equipment, that is a calling or called party, is great can easily converse without cumbersome operations associated with re-origination or callback when the speed becomes lower than the upper limit.

The principle of the thirteenth mobile station equipment according to the present invention is as follows.

When a call for which channel control should be aborted is a completed call, a channel controlling section 12 attempts to abort the completed call.

In the mobile station of this construction, when the speed is higher than the upper limit, conversation started already is quickly aborted and so accidents due to high-speed can be prevented with improved reliability.

The principle of the twelfth base station equipment according to the present invention is as follows.

When a call for which channel control should be aborted is a completed call, a channel controlling section 22 attempts to abort the completed call.

In the base station equipment of this construction, with respect to a mobile station having a speed higher than the upper limit, conversation is quickly aborted and so accidents due to high-speed can be prevented with improved reliability.

The principle of the thirteenth exchange according to the present invention is as follows.

When a call for which a call process should be aborted is a completed call, a call processing section 33 attempts to abort the completed call.

In the exchange of this construction, with respect to a mobile station having a speed higher than the upper limit, conversation is quickly aborted and so accidents due to high-speed can be prevented with improved reliability.

The principle of the thirteenth base station equipment according to the present invention is as follows.

Functions are distributed between radio control station equipment 28 that is a main component for providing channel control and radio base station equipment 29 that provides an interface between the radio control station equipment 28 and a radio transmission path.

The base station equipment of this construction can flexibly adapt itself to an area where mobile stations can be located, to the distribution of these mobile stations in this area, to the zone configuration and to channel allocation. Therefore, the service quality is improved and maintained high.

Figure 4:
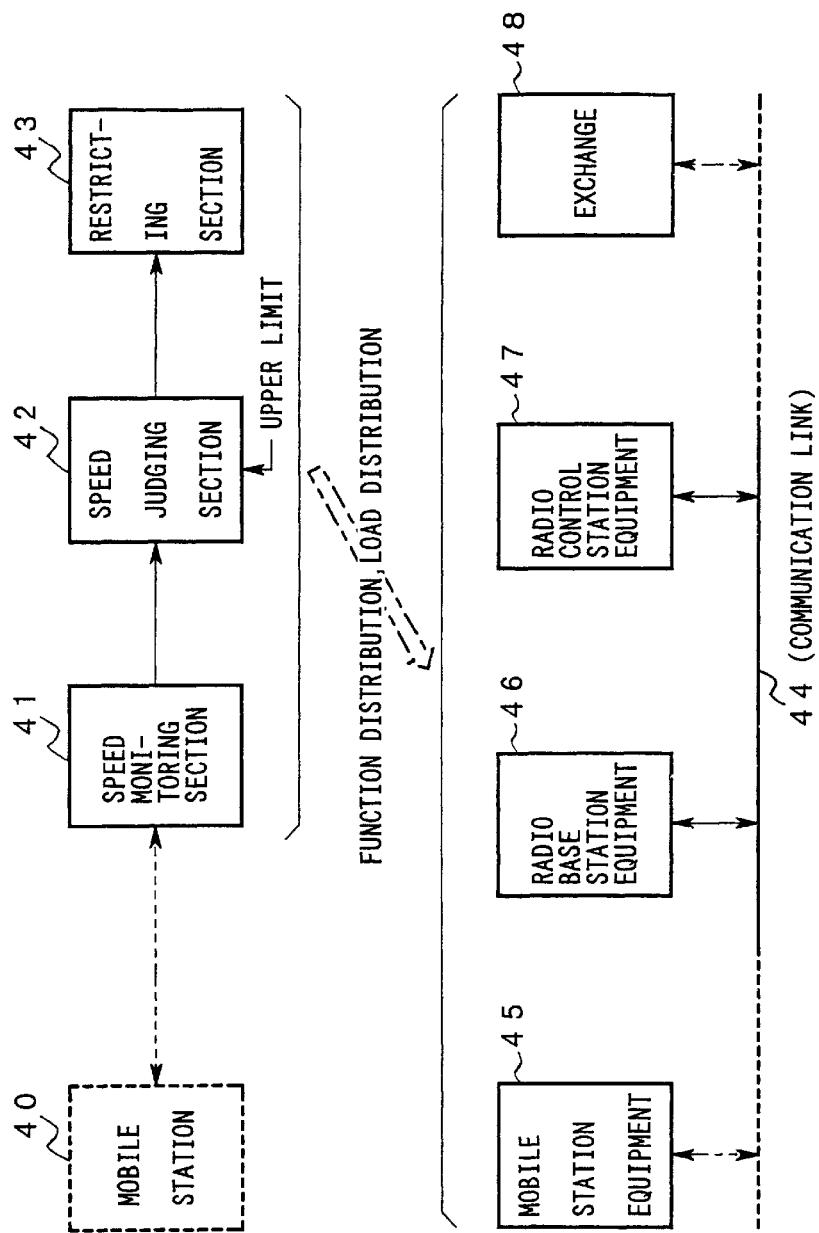
FIG. 4 is a block diagram illustrating the principle of a mobile communication system according to the invention.

FIG. 4 is a block diagram illustrating the principle of a mobile communication system according to the present invention.

The principle of the mobile communication system according to the invention is as follows.

A speed monitoring section 41 monitors the speed of a mobile station 40. A speed judging section 42 judges whether or not the speed monitored by the speed monitoring section 41 exceeds a given upper limit. A restriction section 43 aborts at least one of channel control and call processing associated with calls of the mobile station 40 when the result of the judgement made by the speed judging section 42 is true. The speed monitoring section 41, the speed judging section 42, and the restriction section 43 are constructed as mobile station equipment 45, radio base station equipment 46, radio control station equipment 47, and an exchange 48 that are linked through a communication link 44. At least one of functions and load is distributed among them.

In the mobile communication system of this construction, the speed monitoring section 41 monitors the speed of the mobile station 40. The speed judging section 42 judges whether or not the speed exceeds a given upper limit. The restriction section 43 aborts channel control and/or call processing associated with calls of the mobile station 40 when the result of the judgement is true.

With respect to the aforementioned speed monitoring section 41, speed judging section 42, and restriction means 43, both or at least one of functions and load is distributed and these are built as the mobile station equipment 45, radio base station equipment 46, radio control station equipment 47, and exchange 48 that are linked through the communication link 44.

Accordingly, accidents which would normally be caused when some call is produced in the mobile station 40 and the speed of the mobile station 40 exceeds the given upper limit are prevented with high reliability in association of the mobile station equipment 45, radio base station equipment 46, radio control station equipment 47, and exchange 48.

Embodiments of the present invention are hereinafter described in detail with reference to the drawings.

Figure 5:
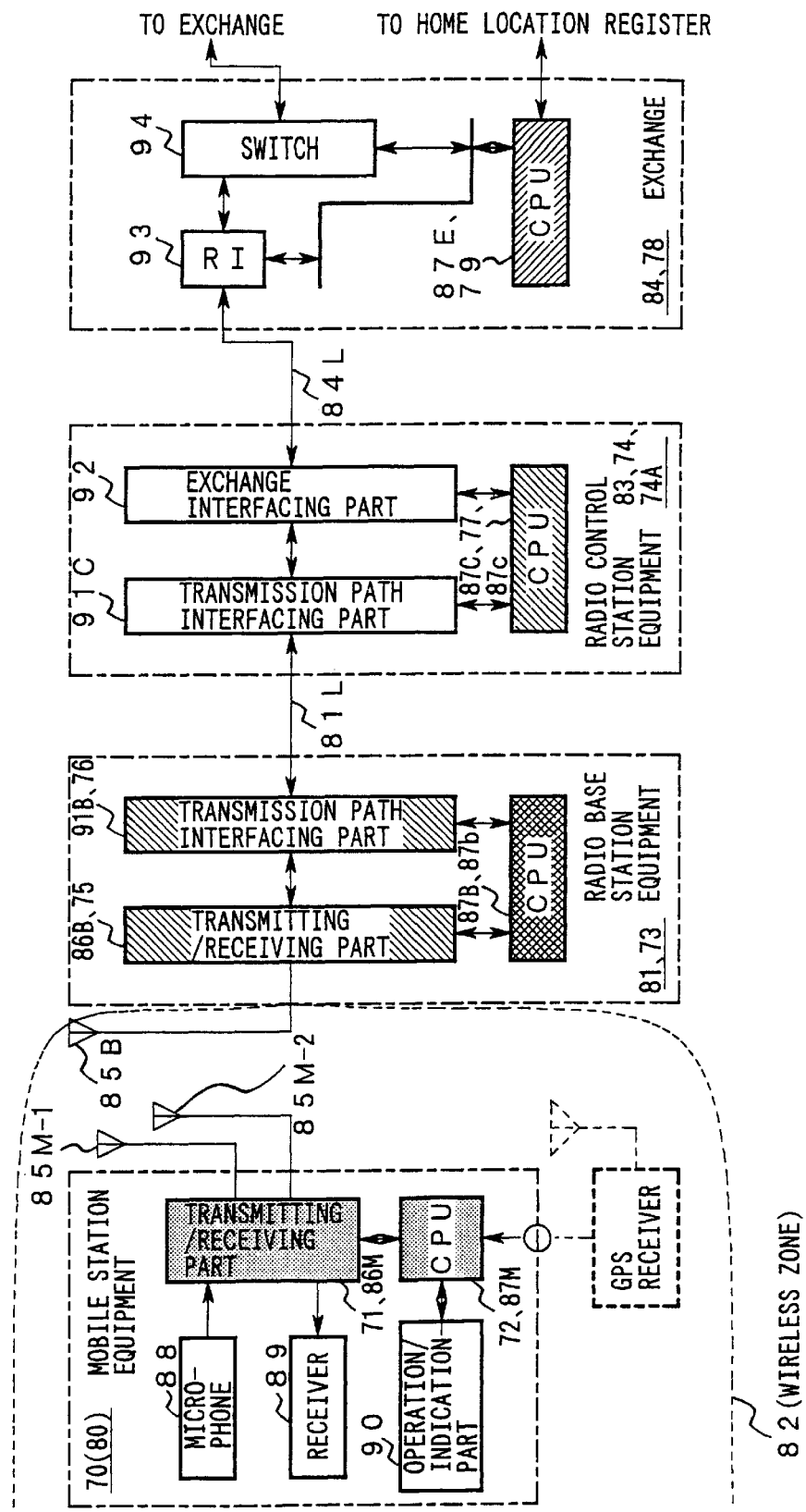
FIG. 5 is a diagram illustrating first through thirteenth embodiments of the invention.

FIG. 5 is a diagram illustrating the first through thirteenth embodiments of the present invention.

Figure 14:
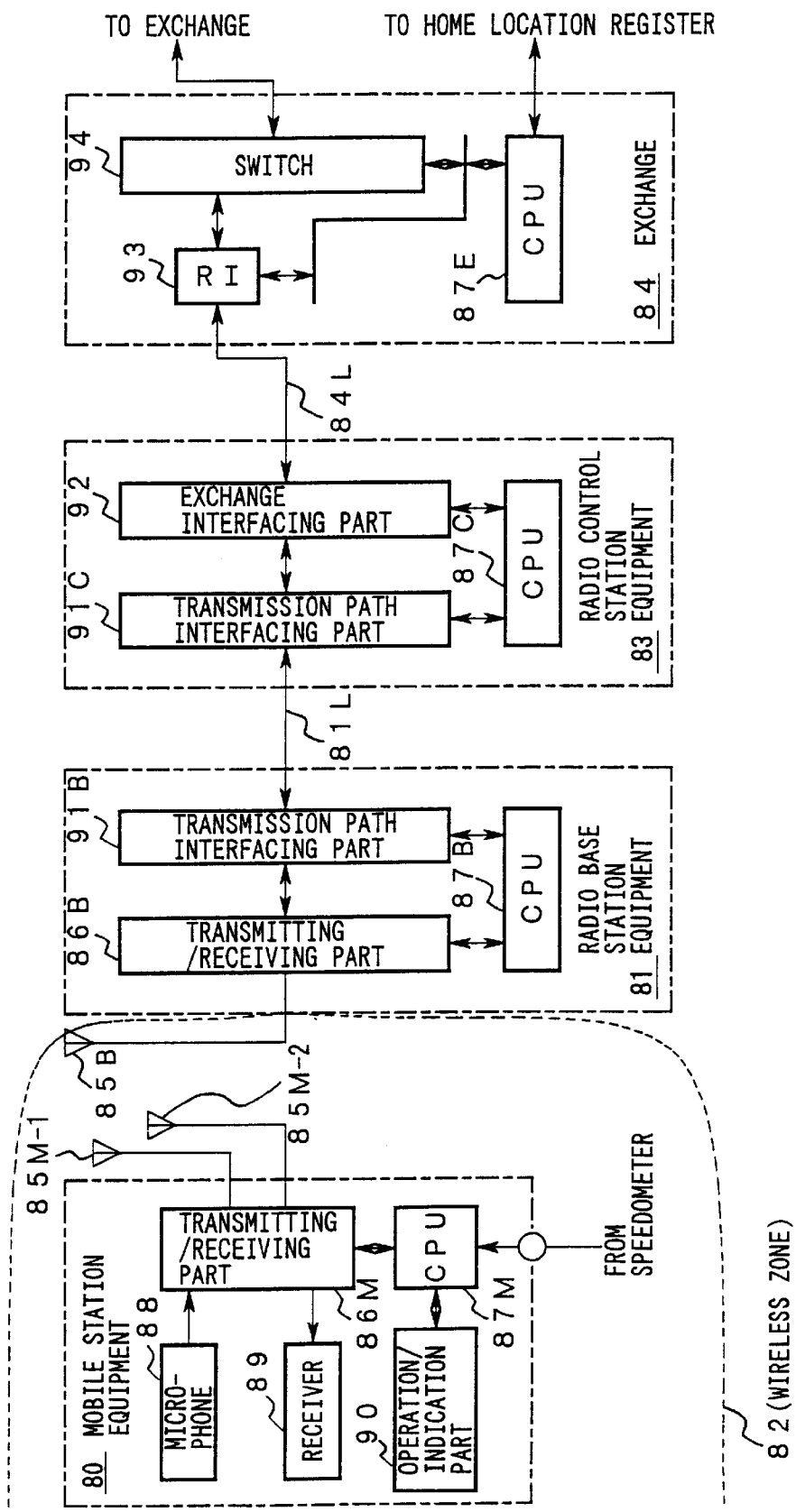
FIG. 14 is a diagram of the configuration of a mobile communication system.

The components in FIG. 5 that are the same in configuration and function as corresponding components in FIG. 14 are given the same reference symbols as the latter and descriptions thereof will be omitted.

The difference in structure between the present embodiment and the prior art structure shown in FIG. 14 lies in the structure of mobile station equipment 70 mounted instead of mobile station equipment 80.

The difference in structure between the mobile station equipment 70 and the mobile station equipment 80 is that a TX/RX part 71 and a processor 72 are mounted instead of the TX/RX part 86M and the processor 87M, respectively.

Figure 6:
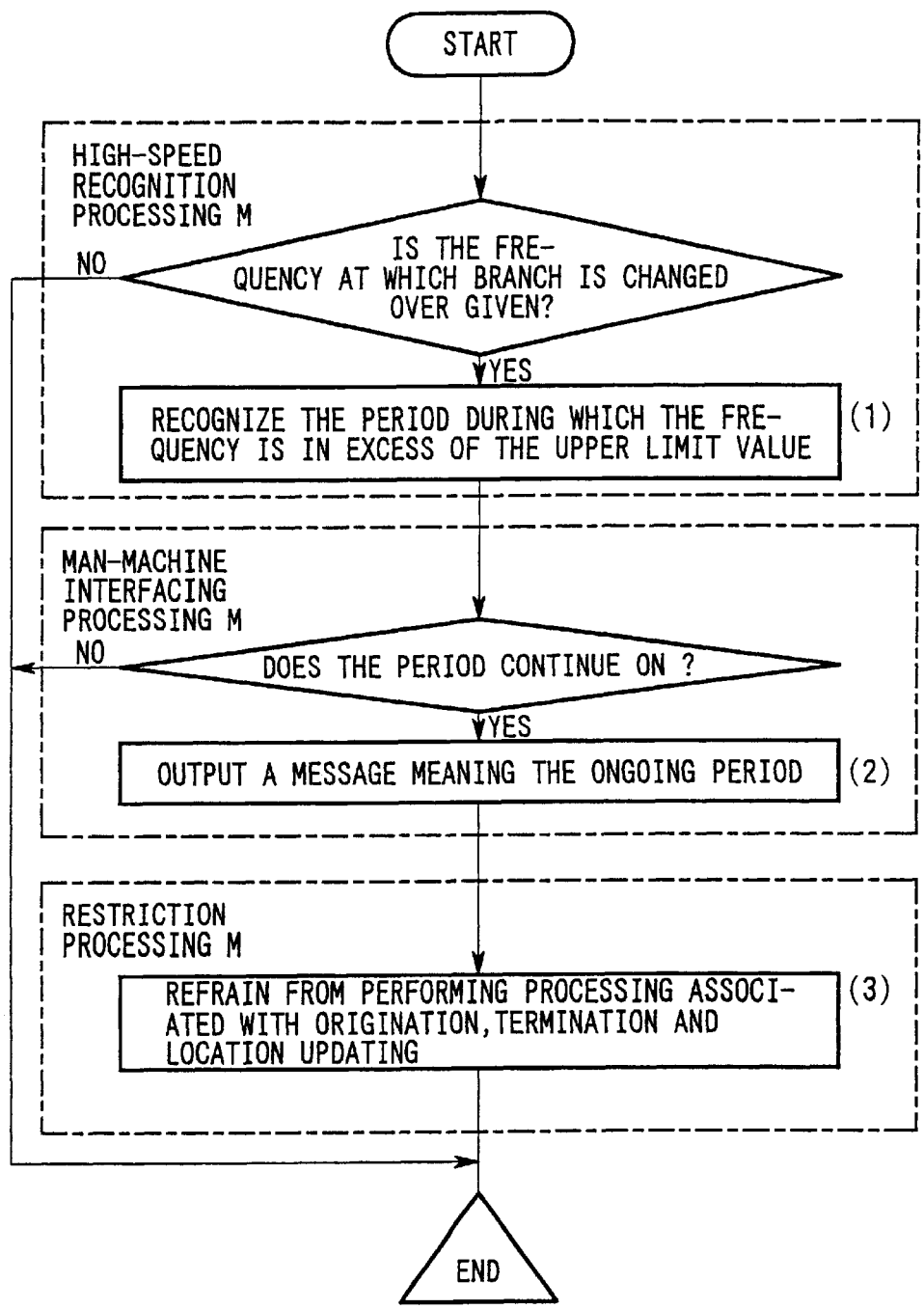
FIG. 6 is a flow chart illustrating the operation of the first embodiment of the invention.

FIG. 6 is a flow chart illustrating the operation of the first embodiment of the present invention.

The operation of the present embodiment is described below by referring to FIGS. 5 and 6.

The TX/RX part 71 measures the frequency at which a receiving wave, of receiving waves arrive at antennas 85M-1 and 85M-2 from radio base station equipment 81, that is selected according to the switching diversity described above is switched. The TX/RX part 71 notifies the processor 72 of the frequency and whether the frequency is greater or smaller than a given upper limit. The processing performed by the TX/RX part 71 will be hereinafter referred to as "speed measuring processing M".

The processor 72 recognizes the period for which the frequency exceeds the upper limit, according to the notice (FIG. 6(1)). The processing for recognizing the period will hereinafter be referred to as "high-speed recognition processing M".

The processor 72 outputs a message to the operation/indication part 90 to display the message (FIG. 6(2)). The processing for outputting the message will hereinafter be referred to as "man-machine interface processing M".

The processor 72 refrains from performing processing to be invoked as the channel control described above in response to origination request for origination and/or a paging signal (both described later) and from performing processing associated with location updating to be invoked based on the procedure of this channel control (FIG. 6(3)).

Origination request for origination given by an operator through the operation/indication part 90

A paging signal sent to the local station from the radio base station equipment 81 and given through antennas 85M-1, 85M-2 and TX/RX part 71.

The processing for causing the processor 72 to refrain from the aforementioned kinds of processing will hereinafter be referred to as "restriction processing M".

Therefore, an operator can recognize that both origination and terminating of the local station are restricted to prevent accidents due to high-speed while the message is being displayed.

Generally, the frequency measured by the TX/RX part 71 as mentioned above increases with the speed of the mobile station equipment 70.

In particular, where the aforementioned upper limit is predetermined to a desired value, when the mobile station equipment 70 is moving at a high speed, origination and response to the terminating call which can be enabled according to some operation performed on the mobile station equipment 70 are restricted. Furthermore, location updating that would be a factor for the equipment to transist to a mode in which such operation is permitted is postponed.

In the present embodiment, the above-described speed measuring processing M, high-speed recognition processing M, and restriction processing M are carried out by the association of the processor 72 with the TX/RX part 71 in the process of the channel control without modifying the fundamental structure of the prior art example shown in FIG. 14 to a large extent.

Accordingly, where the mobile station equipment 70 is mounted in a mobile moving at a high speed, accidents which would normally be caused due to driver's operation on the mobile station equipment 70 are prevented with high reliability.

In the present embodiment, the speed of the mobile station equipment 70 is indirectly obtained from the frequency at which the branch is switched based on the switching diversity. However, for example, the speed may be obtained as a reduced value of the frequency of fading accompanying receiving waves.

The speed may be indirectly obtained as a two- or three-dimensional rate of change of the location of the local station measured by a device that is incorporated in the mobile station equipment 70 for which radio navigation or self-contained navigation is applied.

In the present embodiment, the method of providing the man-machine interface through the operation/indication part 90 under control of the processor 72 is not described in detail. For instance, desired message in the form of tone or speech may be generated, in addition to visual information.

The second embodiment of the present invention is described now.

The difference in structure between the present embodiment and the prior art example shown in FIG. 14 is that radio base station equipment 73 and radio control station equipment 74 are mounted instead of the radio base station equipment 81 and the radio control station equipment 83, respectively.

The difference in structure between the radio base station equipment 73 and the radio base station equipment 81 is that a TX/RX part 75 and a transmission path interfacing part 76 are mounted instead of the TX/RX parts 86B and the transmission path interfacing part 91B, respectively.

The difference between the radio control station equipment 74 and the radio control station equipment 83 is that a processor 77 is mounted instead of the processor 87C.

Figure 7:
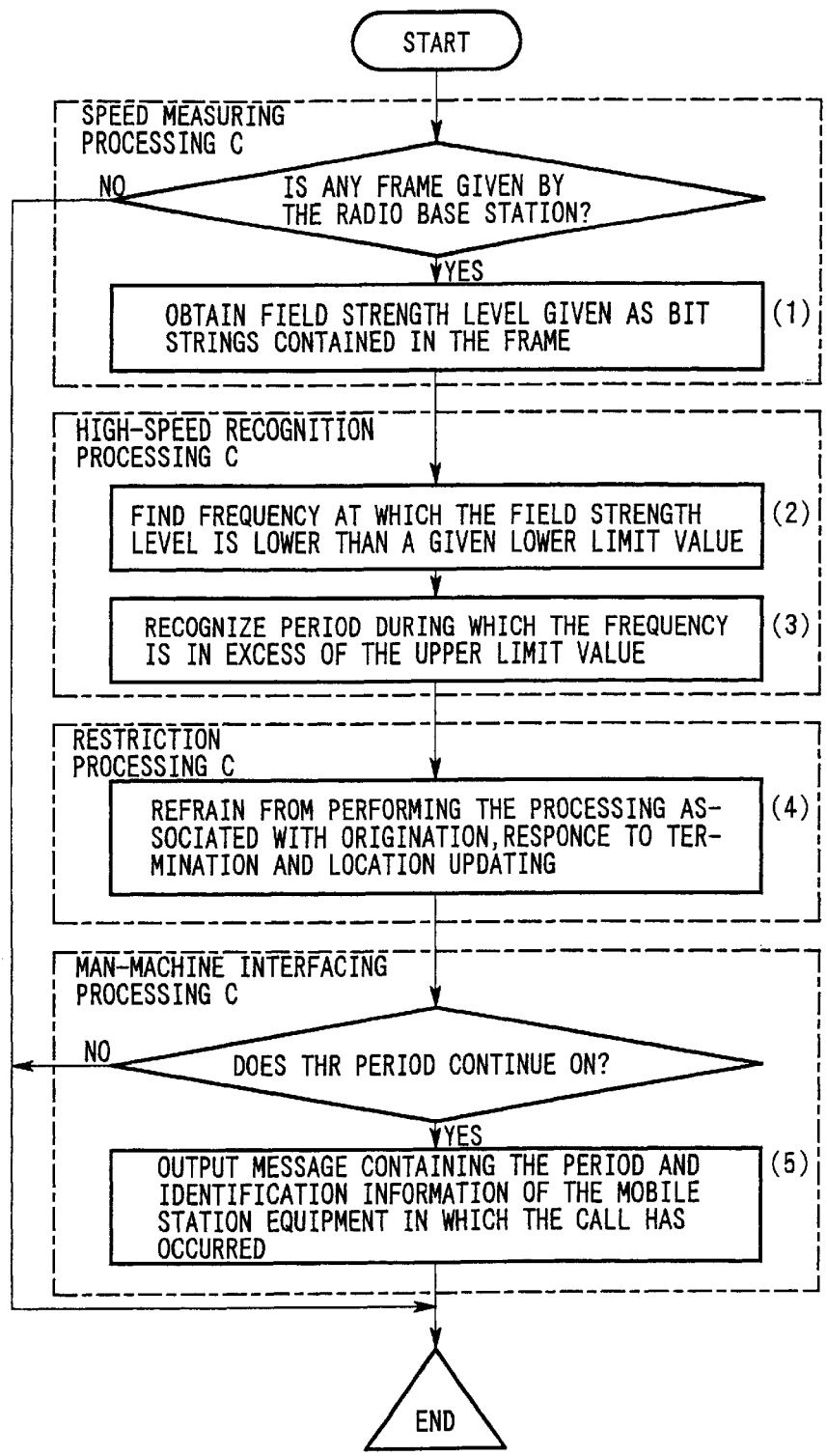
FIG. 7 is a flow chart illustrating the operation of the second embodiment of the invention.

FIG. 7 is a flow chart illustrating the operation of the second embodiment of the present invention.

The operation of the present embodiment is hereinafter described by referring to FIGS. 5 and 7.

In the radio base station equipment 73, the TX/RX part 75 demodulates the receiving waves that reached to an antenna 85B from the mobile station equipment 80 to generate a baseband signal, measures the field strength level of the receiving waves, and generates respectively frames (or packets) in which bit strings indicating the baseband signal and the field strength level are contained in given form.

The TX/RX part 75 transmits these frames to the radio control station equipment 74 through the transmission path interfacing part 76 and through the communication link 81L.

In the radio control station equipment 74, the processor 77 is fed with the frames through the communication link 81L and the transmission path interfacing part 91C. The processor 77 obtains a field strength level given as bit strings contained respectively in the frames (FIG. 7(1)). The processing for obtaining the field strength level will hereinafter be referred to as "speed measuring processing C". The processor 77 obtains the frequency of the field strength level lower than a given lower limit value (FIG. 7(2)).

The processor 77 discriminates the frequency and whether the frequency is greater or smaller than the given upper limit.

The processor recognizes the period for which the frequency exceeds the upper limit (FIG. 7(3)). The processing for recognizing the period will hereinafter be referred to as "high-speed recognition processing C".

During this period, the processor 77 refrains from performing channel control associated with calls of which the mobile station equipment 80 is to be the originating party or the terminating party and with location updating, as long as the mobile station equipment 80 is concerned (FIG. 7(4)). The processing performed by the processor 77 to refrain from performing the channel control will hereinafter be referred to as "restriction processing C".

During the period described above, the processor 77 outputs a message to a manual operation/display portion (not shown). The message contains, in addition to the period, information for identifying the mobile station equipment 80 in which the corresponding call including location updating occurs (FIG. 7(5)). The processing for outputting such a message will hereinafter be referred to as "man-machine interface processing C".

Accordingly, a personnel in charge of maintenance and operation for the radio control station equipment 83 can recognize the mobile station equipment in which origination and terminating response are restricted, by referring to this message, in order to prevent accidents due to high-speed.

Generally, the frequency at which the field strength level measured by the TX/RX part 75 drops below the lower limit value as mentioned above in the radio base station equipment 73 increases with the speed at which the mobile station equipment 80 moves.

That is, as long as the upper limit is predetermined to a preferable value, during the period for which the mobile station equipment 80 is moving at a high speed, origination that would normally be permitted in response to some manual operation on the mobile station equipment 80 and response to termination calls are restricted. Also, location updating leading to a state in which the equipment can transist to a mode in which such a manual operation is allowed is postponed.

Accordingly, where the mobile station equipment 80 is mounted in a mobile moving at a high speed, accidents which would normally be caused by driver's operation on the mobile station equipment 80 can be prevented with high reliability.

In the present embodiment, the aforementioned speed measuring processing C, high-speed recognition processing C, and restriction processing C are carried out by association of the processor 77 with the radio base station equipment 73 in the process of channel control without modifying the fundamental structure of the prior art example shown in FIG. 19 substantially.

In the present embodiment, the radio base station equipment 73 and the radio control station equipment 74 associate with each other through communication link 81L to perform desired channel control. However, these radio base station equipment 73 and radio control station equipment 74 may be combined into a unit. Alternatively, they may be so designed that functions or load is distributed in any form.

The third embodiment of the present invention is hereinafter described.

The difference in structure between the present embodiment and the second embodiment is that radio control station equipment 74A and an exchange 78 are mounted instead of the radio control station equipment 74 and the exchange 84, respectively.

The difference in structure between radio control station equipment 74A and radio control station equipment 74 is that a processor 87C is mounted instead of the processor 77.

The difference in structure between the exchanges 78 and 84 is that the processor 79 is mounted instead of the processor 87E shown in FIG. 14.

Figure 8:
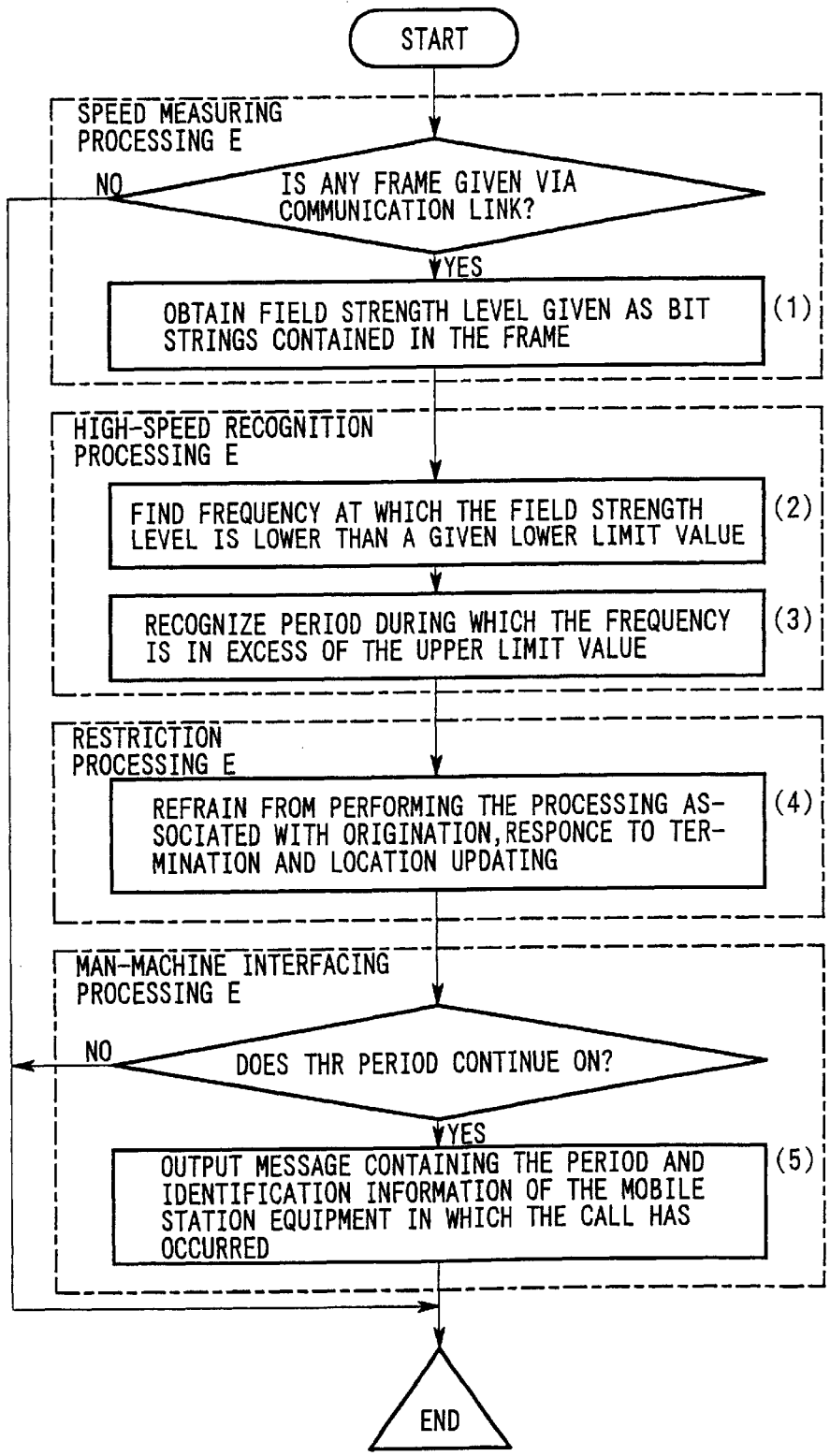
FIG. 8 is a flow chart illustrating the operation of the third embodiment of the invention.

FIG. 8 is a flow chart illustrating the operation of the third embodiment of the present invention.

The operation of the present embodiment is hereinafter described with reference to FIGS. 5 and 8.

In the radio base station equipment 73, the TX/RX part 75 demodulates the receiving waves that reached to an antenna 85B from the mobile station equipment 80 to create a baseband signal, measures the field strength level of the receiving waves, and generate frames (or packets) in which bit strings indicating the baseband signal and field strength level are contained in given form.

The TX/RX part 75 transmits these frames to the exchange 78 through the transmission interfacing portion 76, communication link 81L, radio control station equipment 74A, and communication link 84L.

Since the various portions of the radio control station equipment 74A operate similarly to the various portions of the radio control station equipment 83 shown in FIG. 14, detailed description of them is omitted herein.

In the exchange 78, the processor 79 obtains the field strength level represented in terms of bit strings contained respectively in the frames given the communication link 84L and through the radio interfacing part 93 (FIG. 8(1)). This processing performed by the processor 79 will hereinafter be referred to as "speed measuring processing E". The processor 79 also measures the frequency at which the field strength level is lower than a given lower limit value (FIG. 8(2)).

Furthermore, the processor 79 judges whether the frequency is greater or smaller than the given upper limit, and recognizes the period for which the frequency exceeds the upper limit (FIG. 8(3)). The processing for recognizing the period will hereinafter be referred to as "high speed recognition processing E".

As far as the mobile station equipment 80 is concerned, the processor 79 refrains from channel control associated with calls the originating party or the terminating party of which is the mobile station equipment 80 and with location updating during this period (FIG. 8(4)). The processing for causing the processor 79 to refrain from performing the channel control will hereinafter be referred to as "restriction processing E".

During the period described above, the processor 79 supplies a message containing information for identifying, in addition to the period, the mobile station equipment 80 where the corresponding call including location updating occurs to a terminal device (not shown) (FIG. 8(5)). The processing for creating such a message will hereinafter be referred to as "man-machine interface processing E".

Therefore, a personnel in charge of maintenance and operation for the exchange 78 can recognize the mobile station equipment in which origination and terminating response are restricted to prevent accidents due to high-speed, by referring to this message.

Generally, the frequency at which the field strength level measured by the TX/RX part 75 drops below the lower limit value as mentioned above increases with the speed at which the mobile station equipment 80 moves.

That is, as long as the upper limit described above is predetermined to a preferable value, when the mobile station equipment 80 is moving at a high speed, origination that would normally be permitted in response to some manual operation on the mobile station equipment 80 and response to termination calls are restricted. Also, location updating leading to a state in which the equipment can transist to a mode in which such a manual operation is allowed is postponed.

Accordingly, accidents that would normally be caused by user's operation on the mobile station equipment 80 while the mobile station equipment 80 is moving at a high speed are prevented with high reliability.

In the present embodiment, the aforementioned speed measuring processing E, high speed recognition processing E, and restriction processing E are carried out by association of the processor 79 with the radio base station equipment 73 and radio control station equipment 74A in the process of call processing without modifying the structure of the prior art example shown in FIG. 14 fundamentally.

Figure 9:
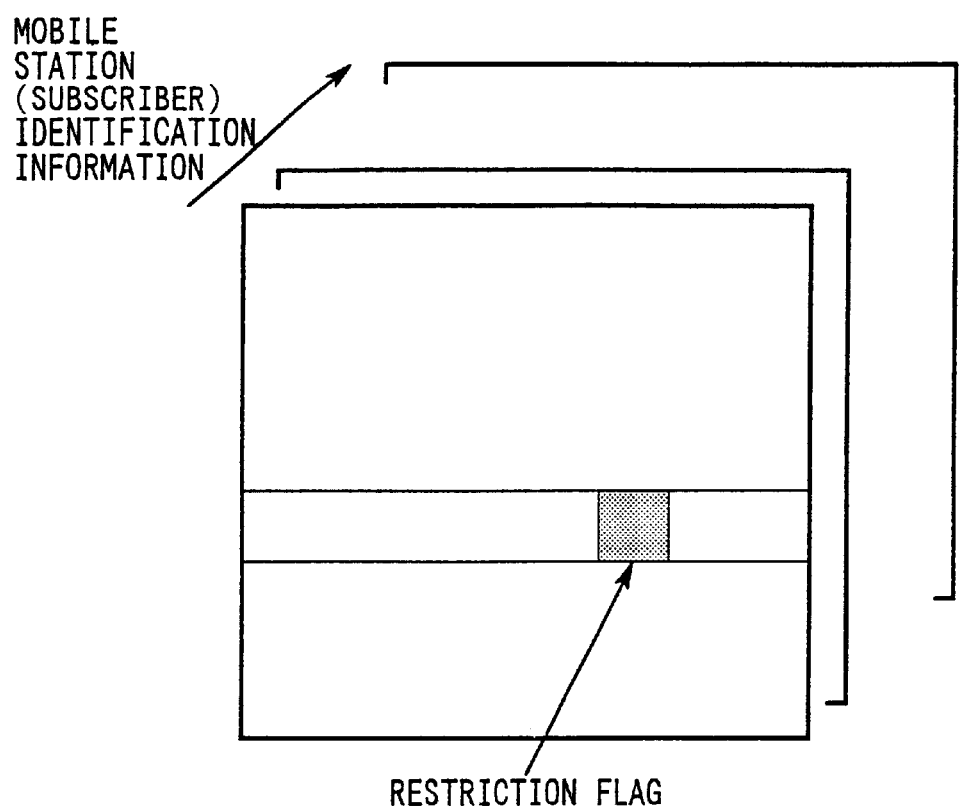
FIG. 9 is a diagram illustrating an example of structure of a home memory to which a restriction flag is attached.

In the present embodiment, abortion of the aforementioned call processing is realized as the procedure of call processing. The abortion of the call processing may also be accomplished as indicated by the hatching in FIG. 9 by appropriately updating a restricting flag with the speed of the mobile station and confirming the logical value of the restricting flag that is attached to a home memory incorporated in a home location register corresponding to the mobile station where the corresponding call has occurred.

In the present embodiment, with respect to mobile station equipment having a speed exceeding the upper limit described above, call processing is aborted irrespective of the call occurring in the mobile station equipment.

However, even for a call the originating party or the terminating party of which is a mobile station having a speed exceeding the upper limit described above, priority may be given to services offered to an important call such as a call to police stations or firehouses and a call of the originating party of a subscriber having a subscriber class to which a VIP attribute is attached, by appropriately refraining from aborting the call processing.

The fourth embodiment of the present invention is hereinafter described.

The difference between the present embodiment and the first embodiment already described is that a processor 87b is mounted instead of the processor 87B in the radio base station equipment 81 and that radio control station equipment 74 is mounted instead of the radio control station equipment 83.

Figure 10:
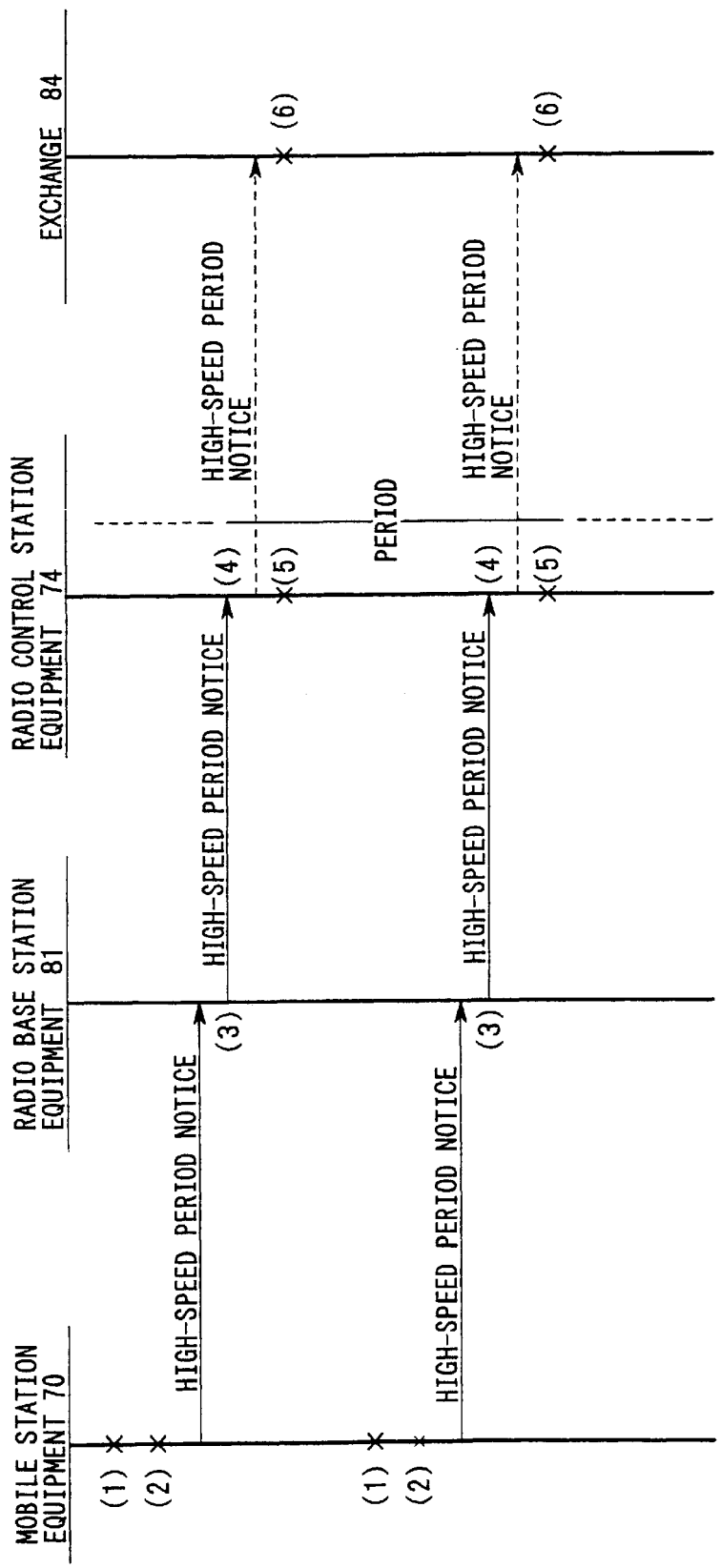
FIG. 10 is a diagram illustrating the operation of the fourth embodiment of the invention.

FIG. 10 is a diagram illustrating the operation of the fourth embodiment of the present invention.

The operation of the present embodiment is described below by referring to FIGS. 5 and 10.

The difference between the present embodiment and the first embodiment is that the aforementioned restriction processing M is not performed by the mobile station equipment 70 but restriction processing C instead of the restriction processing M is performed by radio control station equipment 74 as described later.

In the mobile station equipment 70, a TX/RX part 71 performs speed measuring processing M in the same way as in the first embodiment (FIG. 10(1)), and a processor 72 performs high speed recognition processing M (FIG. 10(2)).

The processor 72 creates high-speed period notice indicating the period recognized in the process of the high speed recognition processing M, and sends the high-speed period notice moving as a given message to radio base station equipment 81 through the TX/RX part 71 and antennas 85-1, 85-2.

Such messages are appropriately delivered among equipments in the process of channel control or call processing like DISPIE (display information element) conforming to recommendations of ITU-T, and are created as information elements appropriately referenced as operands of the channel control or the call processing.

In all the embodiments described below, information described as message(s) is/are created as information elements similarly and delivered among equipments.

In radio base station equipment 81, when the processor 87b receives the high-speed period notice moving through an antenna 85B and a TX/RX part 86B, the processor 87b relays the high-speed period notice moving is routed to radio control station equipment 74 through a transmission path interfacing part 91B and-a communication link 81L (FIG. 10(3)).

In the radio control station equipment 74, a processor 77 receives the high-speed period notice moving through a transmission path interfacing part 91C, thus recognizing the period (FIG. 10(4)).

Furthermore, the processor 77 refrains from channel control associated with calls the originating party or the terminating party of which is mobile station equipment 80 and with location updating of the mobile station equipment 80, thus performing the restriction processing C (FIG. 10(5)).

That is, the speed measuring processing M and the high speed recognition processing M are performed by the mobile station equipment 70, thus suppressing increase of the load on the radio control station equipment 74. This radio control station equipment 74 performs the restriction processing C instead of the restriction processing M.

Accordingly, the possibility that the service quality deteriorates by congestion in the radio control station equipment 74 is reduced. The restriction processing C is performed only under the channel control principally provided by the radio control station equipment 74.

In the present embodiment, the restriction processing is performed by the radio control station equipment 74. However, the restriction processing E is carried out solely under the call processing according to the configuration in which the radio control station equipment 74 relays the aforementioned high-speed period notice moving to the exchange 84 through a switching interfacing part 92 and a communication link 84L and the exchange 84 perform the restriction processing E during the period indicated by the "notice of the period of the high-speed" (FIG. 10(6)).

The fifth embodiment of the present invention is hereinafter described.

The difference in structure between the present embodiment and the first embodiment described above is that the radio base station equipment 81 is equipped with a processor 87b instead of the processor 87B and that radio control station equipment 74 is mounted instead of the radio control station equipment 83.

Figure 11:
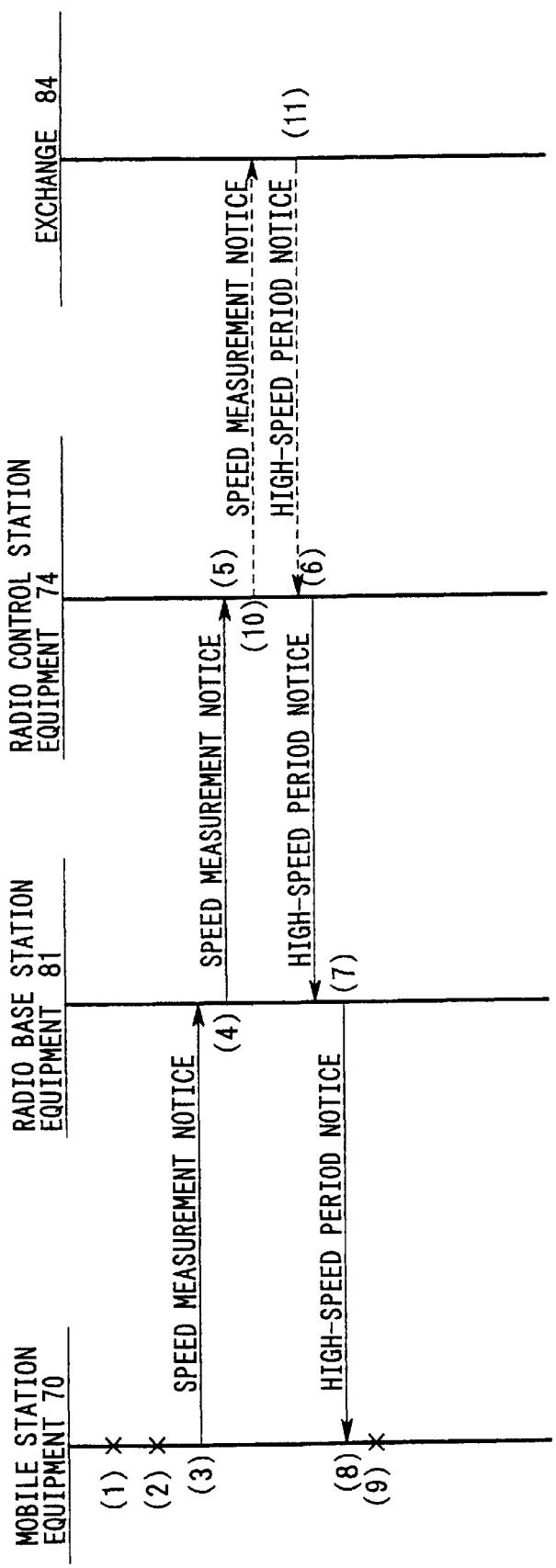
FIG. 11 is a diagram illustrating the operation of the fifth embodiment of the invention.

FIG. 11 is a diagram illustrating the operation of the fifth embodiment of the present embodiment.

The operation of the present embodiment is hereinafter described by referring to FIGS. 5 and 11.

The difference between the present embodiment and the first embodiment is that the aforementioned high speed recognition processing M is not performed in the mobile station equipment 70 and that the high speed recognition processing C replacing the high speed recognition processing M is performed by the radio control station equipment 74.

In the mobile station equipment 70, the TX/RX part 71 performs the speed measuring processing M (FIG. 11(1)) in the same way as in the first embodiment. The processor 72 creates a "speed measurement notice" indicating the frequency of notices given as a result of the speed measuring processing M (FIG. 11(2)). The processor 72 sends the "speed measurement notice" as a given message to the radio base station equipment 81 through the TX/RX part 71 and antennas 85-1, 85-2 (FIG. 11(3)).

In the radio base station equipment 81, when the processor 87b receives this "speed measurement notice" through antenna 85B and TX/RX part 86B, the processor 87b relays the notice to the radio control station equipment 74 through transmission path interfacing part 91B and communication link 81L (FIG. 11(4)).

In the radio control station equipment 74, when the processor 77 receives this "speed measurement notice" through transmission path interfacing part 91C, the processor 77 recognizes the period for which the frequency contained in the notice exceeds the given upper limit, thus performing the high speed recognition processing C instead of the aforementioned "high speed recognition processing M" (FIG. 11(5)).

Furthermore, the processor 77 creates a "high-speed period notice moving" indicating the period recognized in this way, and sends the "notice of the period" as a message to the radio base station equipment 81 through the transmission path interfacing part 91C and the communication link 81L (FIG. 11(6)).

In the radio base station equipment 81, when the processor 87b receives the "high-speed period notice moving" through the transmission path interfacing part 91B, the processor 87b relays the notice to the mobile station equipment 70 through the TX/RX part 86B and the antenna 85B (FIG. 11(7)).

In the mobile station equipment 70, in order that the processor 72 receive the "high-speed period notice moving" through antennas 85-1, 85-2, and TX/RX part 71 (FIG. 11(8)), the processor 72 refrains from channel control regarding calls associated with the local station (FIG. 11(9)).

That is, the speed measuring processing M and the restriction processing M are performed by the mobile station equipment 70, thus suppressing increase of the load on the radio control station equipment 74. This radio control station equipment 74 performs the high speed recognition processing C instead of the high speed recognition processing M.

Accordingly, the possibility that the service quality is deteriorated due to congestion in the radio control station equipment 74 is suppressed. The high speed recognition processing M described above is performed only by the radio control station equipment 74 under standards flexibly conforming to the channel control.

In the present embodiment, the high speed recognition processing M is performed by the radio control station equipment 74. However, for instance, the radio control station equipment 74 may relay the "speed measurement notice" to the exchange 84 through the exchange interfacing part 92 and the communication link 84L (FIG. 11(10)), and the exchange 84 may perform the "high speed recognition processing E" (FIG. 11(11)) in response to the "speed measurement notice", whereby the period for which a mobile carrying the mobile station equipment 70 is moving at a high speed is recognized only during the period of call processing.

The sixth embodiment of the present invention is hereinafter described.

The configuration of the present embodiment is essentially the same as that of the fifth embodiment described above and so it is not described herein.

Figure 12:
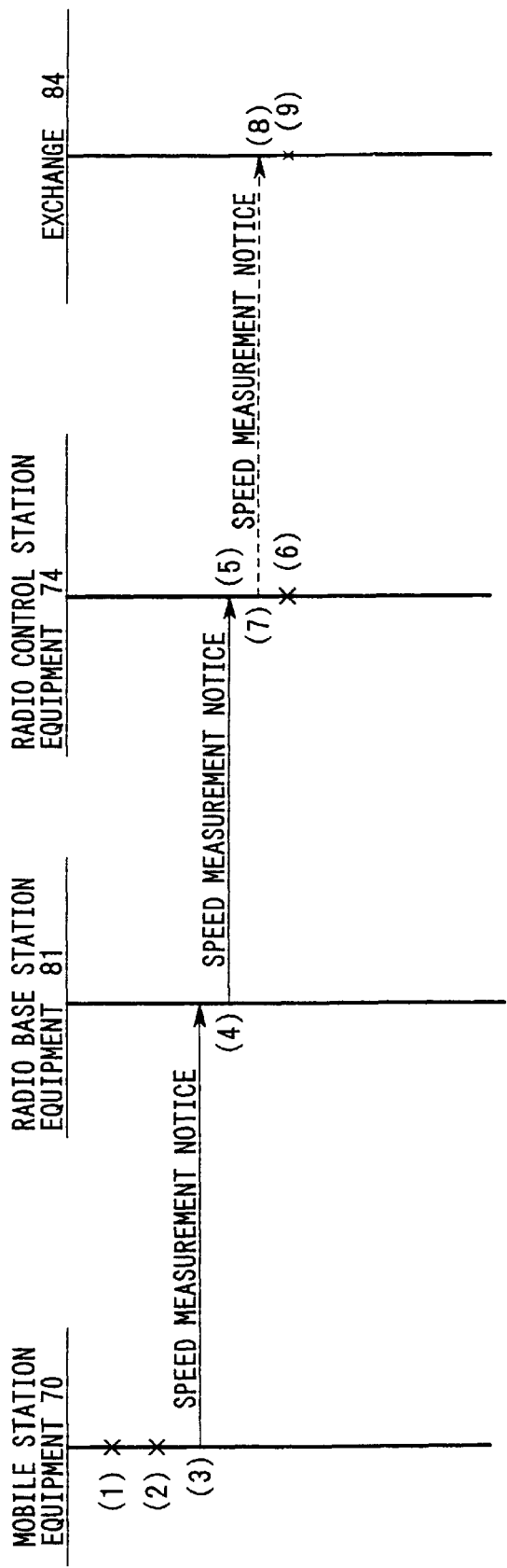
FIG. 12 is a diagram illustrating the operation of the sixth embodiment of the invention.

FIG. 12 is a diagram illustrating the operation of the sixth embodiment of the present invention.

The operation of the present embodiment is hereinafter described by referring to FIGS. 5 and 12.

The difference between the present embodiment and the fifth embodiment is that the restriction processing M and the aforementioned high speed recognition processing M is not performed in the mobile station equipment 70 and that high speed recognition processing C and restriction processing C replacing the high speed recognition processing M and restriction processing M are carried out by the radio control station equipment 74 as described later.

In the mobile station equipment 70, a TX/RX part 71 performs the speed measuring processing M (FIG. 12(1)) in the same way as in the first embodiment. A processor 72 creates a "speed measurement notice" indicating the "frequency" given as a result of the speed measuring processing M (FIG. 12(2)).

The processor 72 sends the "speed measurement notice" as a given message to the radio base station equipment 81 through the TX/RX part 71 and through antennas 85-1, 85-2 (FIG. 12(3)).

In the radio base station equipment 81, when the processor 87b receives the "high-speed period notice moving measurement of speed" through the antenna 85B and the TX/RX part 86B, the processor 87b relays the "speed measurement notice" to the radio control station equipment 74 through the transmission path interfacing part 91B and through the communication link 81L (FIG. 12(4)).

In the radio control station equipment 74, when the processor 77 receives this "speed measurement notice" through transmission path interfacing part 91C, the processor 77 recognizes the period for which the frequency contained in the notice exceeds the given upper limit, thus performing the high speed recognition processing C instead of the aforementioned high speed recognition processing M (FIG. 12(5)).

The processor 77 refrains from the channel control associated with the mobile station equipment 70 during the period recognized in this way, thus performing the restriction processing C (FIG. 12(6)).

That is, the speed measuring processing M is performed by each unit of the mobile station equipment, thus, the load on the radio control station 74 is suppressed, and the high speed recognition processing C and the restriction processing C replacing the high speed recognition processing M and the restriction processing M, respectively, are performed by the radio control station equipment 74.

Therefore, as long as increase of the load on the radio control station equipment 74 is tolerable, the high speed recognition processing C and the restriction processing C are carried out only by the radio control station equipment 74 in a form adapted to the procedure of channel control.

In the present embodiment, the high speed recognition processing C and the restriction processing C are carried out by the radio control station equipment 74. For example, the exchange 84 may associate (FIG. 12(8), (9)) with the radio control station equipment 74 while messages are being relayed (FIG. 12(7)) by the radio control station equipment 74 to perform the high speed recognition processing C and/or the restriction processing C in a form adapted for the processing performed by the exchange 84.

The seventh embodiment of the present invention is hereinafter described.

The difference between the present embodiment and the first embodiment described above is that the radio control station equipment 74 is mounted instead of the radio control station equipment 83.

Figure 13:
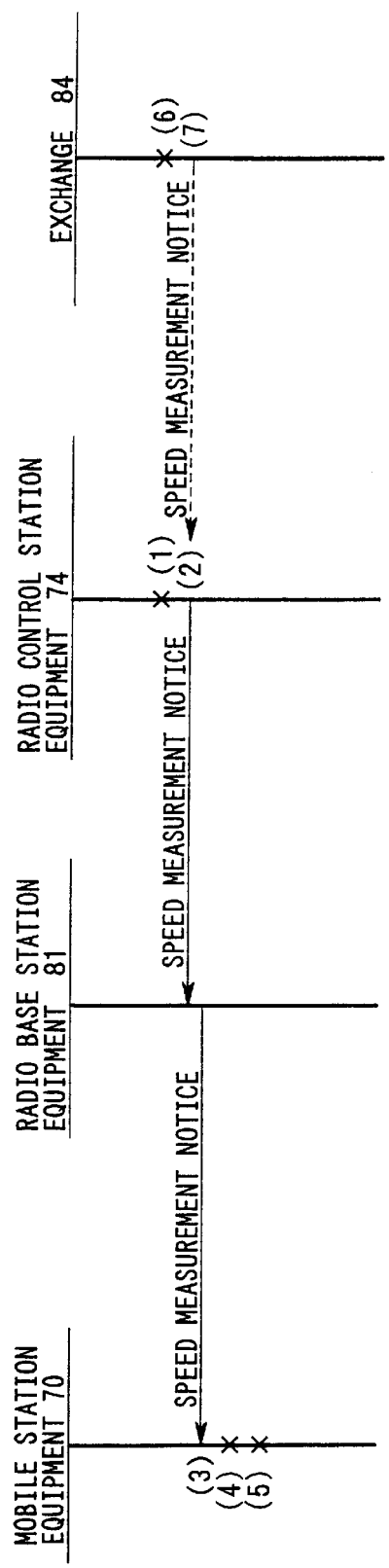
FIG. 13 is a diagram illustrating the operation of the seventh embodiment of the invention.

FIG. 13 is a diagram illustrating the operation of the seventh embodiment of the present invention.

The operation of the present embodiment is hereinafter described by referring to FIGS. 5 and 13.

The difference between the present embodiment and the first embodiment is that the speed measuring processing M is not carried out in the mobile station equipment 70 but rather the radio control station equipment 74 carries out the speed measuring processing C instead of the speed measuring processing M.

In the radio control station equipment 74, the processor 77 performs the speed measuring processing C (FIG. 13(1)) in the same way as the second embodiment described above, thus obtaining the field strength level of receiving waves that reached from the mobile station equipment 70 to the radio base station equipment 81.

The processor 77 creates a "speed measurement notice" indicating the strength of the electric field and sends the "speed measurement notice" as a message to the mobile station equipment 70 through the transmission path interfacing part 91C, communication link 81L, and radio base station equipment 81 (FIG. 13(2)).

In the mobile station equipment 70, the processor 72 receives the speed measurement notice through the TX/RX part 71 and obtains the frequency at which the field strength level contained in the speed measurement notice are below a given lower limit value (FIG. 13(3)).

Furthermore, the processor 72 judges whether or not the frequency is greater or smaller than the given upper limit, performs the high speed recognition processing M for recognizing the period for which the frequency exceeds the upper limit (FIG. 13(4)), and performs restriction processing M during this period in the same way as in the first embodiment (FIG. 13(5)).

Therefore, in the present embodiment, the high speed recognition processing and restriction processing adapted for the transmission quality of the upward radio transmission path formed between the mobile station equipment 70 and the radio base station equipment 81 is mainly performed by the mobile station equipment 70.

In the present embodiment, the speed measuring processing C is performed by the radio control station equipment 74. As shown in FIG. 13, (6), (7), the speed measuring processing E replacing the speed measuring processing C may be carried out by the exchange 84.

In the aforementioned fourth through seventh embodiments, one or more certain kinds of processing out of the speed measuring processing, the high speed recognition processing, and the restriction processing are performed by the mobile station equipment 70. Instead, these certain kinds of processing may be carried out by the radio control station equipment 74 and/or the exchange 84 that transmit and receive a given message to and from each other through the radio transmission path and communication links 81L, 84L and associate with each other.

However, when these speed measuring processing, high speed recognition processing, and restriction processing are carried out reliably by delivering a given message onto each other, they may be performed by any one of the mobile station equipment 70, radio control station equipment 74, and exchange 84.

Functions and/or load associated with the speed measuring processing, high speed recognition processing, and restriction processing may be dispersed in any form by plural units that associate with each other by transmitting and receiving a given message to and from each other.

In addition, the mobile station equipment 70, 80, the radio base station equipment 71, 73, the radio control station equipment 83, 74, 74A, and the exchanges 84, 78 may be configured as equipments for realizing the mobile communication system according to the present invention simply by delivering the given message onto each other without performing any of the speed measuring processing, the high speed recognition processing, and the restriction processing.

The operation of the eighth embodiment of the invention is hereinafter described with reference to FIG. 5.

The difference between the present embodiment and the first, fifth, or seventh embodiment is that channel control once suspended by the processor 72 that performed the restriction processing M is treated as follows by the processor 72 in the mobile station equipment 70.

With respect to a call, including location updating, has occurred at the local station prior to the period for which the restriction processing M should be performed, the processor 72 appropriately collects information (hereinafter referred to as the control information) necessary for retrial or continuation of the channel control until the call becomes completed call and holds the information in a given register previously placed in a main storage. For example, the control information is a phone number or the address of the originating party set through the operation/indication part 90.

When the processor 72 refrains from some channel control by performing the restriction processing M, the processor 72 judges whether or not the originating party of a call activating the channel control is the local station or not.

When the result of the judgement is true, the processor 72 sends a message "The acceptance of the call is suspended and as soon as the aforementioned period ends, channel control necessary for origination will be automatically activated." to the operator through the operation/indication part 90.

However, when the result of the judgement is false, the processor 72 sends a message "The acceptance of the termination call is suspended because the moving speed of the local station is great, and callback to the termination call is reserved." to the operator through the operation/indication part 90. Furthermore, the processor 72 sends a response withholding notice meaning that response to the termination call is suspended to the radio base station equipment 81, 73 through the TX/RX part 71 and antennas 85M-1, 85M-2.

Similarly to the messages described above, this "response withholding notice" is given to the processors 87B, 87b incorporated in the radio base station equipment 81, 73, then to processors 87C, 77 incorporated in the radio control station equipment 83, 74, 74A, and to the processor 79 incorporated in the exchange 84, subsequently.

In the radio control station equipment 83, 74, 74A, when the processors 87C and 77 recognize the "response withholding notice", they associate with the processors 87B and 87b incorporated in the radio base station equipment 81, 73 and abort the channel control associated with the corresponding call.

In the exchange 84, when the processor 79 recognizes the "response withholding notice", the processor 79 aborts the call processing regarding the corresponding call.

During the period for which the restriction processing M should be performed, the processor 72 refrains from the channel control associated with a call that has occurred at the local station and recognizes a state in which it is not necessary to perform the restriction processing M after completion of subsequently performed high speed recognition processing. (Hereinafter referred to as the non-restrictive state).

Note that it is not always necessary that the high speed recognition processing be performed by the processor 72. For example, the processing may be carried out by the radio control station equipment 74 or by the exchange 84 in the same way as in the fifth and seventh embodiments described above.

On recognizing the aforementioned non-restrictive state, the processor 72 judges whether or not useful control information is held or not in the register. When the result of the judgement is false, no special processing.

However, when the result of the judgement is true, the processor 72 judges whether or not the call indicated by the useful control information corresponds to an originating call of the local station.

When the result of the judgement is true, the processor 72 sends a message "start of re-origination corresponding to an originating call previously suspended" to the operator through the operation/indication part 90 and automatically originates by referring to the control information held in the register.

Furthermore, when the result of the judgement is false, he processor 72 sends a message "start of callback to the originating party for the termination call for which response has been previously suspended" to the operator through the operation/indication part 90 and automatically carries out the callback by referring to the control information held in the register.

It is to be noted that the procedure of the channel control to be carried out corresponding to origination and callback automatically performed in this way is not a feature of the present invention. In addition, the procedure can be realized by application of various known techniques and so the procedure is not described herein.

Specifically, when origination or acceptance of termination calls is restricted because the moving speeds of the mobile station equipment 70, 80 exceed the given upper limit, then callback permitting re-origination or acceptance of termination calls that replace the aforementioned origination when the moving speeds drop below the upper limit is automatically done.

Accordingly, in the present embodiment, accidents that would normally occur in the mobile station equipment 70, 80 can be prevented without urging the operator of the mobile station equipment 70, 80 or the originating party of termination calls to the terminating party which should be to the mobile station equipment 70, 80 to perform cumbersome operations. In addition, the service quality and the serviceability are improved.

The operation of the ninth embodiment of the present invention is hereinafter described by referring to FIG. 5.

The difference between the present embodiment and the eighth embodiment is that the above-described re-origination and callback are principally performed by the radio base station equipment 74 as described later.

In the radio control station equipment 74, with respect to a call (including location updating) that has occurred prior to the period during which the restriction processing C should be performed, the processor 77 appropriately collects information (hereinafter referred to as the control information) necessary for retrial or continuation of the channel control until the call becomes a completed call and holds the information in a given register previously placed in a main storage. For example, the control information is a phone number or the address of the originating party set by the originating party.

When the processor 77 refrains from some channel control by performing the restriction processing C, the processor 77 judges whether or not the originating party of a call that is a factor for which the channel control is activated is a mobile station equipment (for simplicity, it is assumed that the equipment is mobile station equipment 70, 80) located within a wireless zone formed by the local station.

Furthermore, when the result of the judgement is true, the processor 77 sends a "reserving notice" meaning that the acceptance of the corresponding call is suspended and the channel control necessary for origination will be automatically activated as soon as the period ends to the mobile station equipment 70, 80 through the transmission path interfacing part 91C, communication link 81L, and radio base station equipment 81, 73.

However, when the result of the judgement is false, the processor 77 sends, as a message, a "response withholding notice" meaning that the response to the termination call is suspended) to the exchange 84 through the exchange interfacing part 92 and the communication link 84L.

This "response withholding notice" is transmitted to the processor 79 incorporated in the exchange 84 similarly to the aforementioned messages.

In the exchange 84, when the processor 79 recognizes the "response withholding notice", the processor 79 associates with the processors 87C, 77 incorporated in the radio control station equipment 74 according to the given procedure, and aborts call processing associated with the call.

In the radio control station equipment 74, the processor 77 refrains from the channel control associated with the corresponding call during the period for which the restriction processing C should be performed, and recognizes a state (hereinafter referred to as the "non-restrictive state" in which it is not necessary to perform the restriction processing C after completion of the high speed recognition processing C performed subsequently).

Note that it is not always necessary that the high speed recognition processing be performed by the processor 77. For example, the processing may be carried out by the radio control station equipment 70, 80 or by the exchange 84.

On recognizing the aforementioned non-restrictive state, the processor 77 judges whether or not useful control information is held in the register. When the result of the judgement is false, no special processing is carried out.

However, when the result of the judgement is true, the processor 77 judges whether or not the call indicated by the useful control information corresponds to an originating call of the mobile station equipment 70, 80.

When the result of the judgement is true, the processor 77 sends a "re-origination notice", as a message, meaning "start of re-origination corresponding to an originating call previously suspended" to the mobile station equipment 70, 80 through the transmission path interfacing part 91C, communication link 81L, and radio base station equipment 81, 73.

Furthermore, the processor 77 automatically provides the channel control for realizing callback to the mobile station equipment 70, 80 and re-origination to a terminating party indicated by the control information, by referring to the control information held in the register.

When the result of the judgement is false, the processor 77 sends a "callback starting notice", as a message, meaning start of callback to the originating party of the termination call for which response is previously suspended, to the exchange 84 through the exchange interfacing part 92 and communication link 84L.

Furthermore, the processor 77 automatically performs the channel control for realizing callback to the originating party indicated by the control information and re-origination to the mobile station equipment 70, 80 by referring to the control information held in the register.

It is to be noted that neither the procedure of the channel control nor the operation of the radio base station equipment 81, 73, mobile station equipment 70, 80, and exchange 84 that operate in association with each other in the process of the channel control constitutes features of the present invention. Rather, they can be realized by application of various known techniques and are not described herein.

In particular, when origination or the acceptance of termination calls is restricted because the moving speeds of mobile station equipment 70, 80 exceed the given upper limit, re-origination and callback are automatically done principally under control of the radio control station equipment 74 when the moving speeds drop below the upper limit.

Accordingly, in the present embodiment, accidents that would normally occur in the mobile equipment 70, 80 can be prevented and the service quality and the serviceability are improved without urging the originating party and the terminating party of a call for which channel control is aborted to perform cumbersome operations and without modifying the structure of software to be loaded in the mobile station equipment 70, 80.

The operation of the tenth embodiment of the present invention is hereinafter described by referring to FIG. 5.

The difference between the present embodiment and the ninth embodiment described above is that the aforementioned re-origination and callback are mainly carried out by exchanges 84, 78 as described later.

In the exchanges 84, 78, with respect to a call (including location updating) occurring prior to the period for which the restriction processing E should be performed, the processor 79 appropriately collects information (hereinafter referred to as the control information) necessary for retrial or continuation of the call processing until the call becomes a completed call, and holds the information in a given register previously placed in a main storage. For example, the control information is a phone number or the address of the originating party set by the originating party.

With respect to a call, including location updating, occurring at the local station during the period for which the restriction processing E should be performed, the processor 79 holds the control information necessary for retrial of call processing in the register. For example, the control information is a phone number or the address of the originating party set by the originating party.

When the processor 79 refrains from some call processing by performing the restriction processing E, the processor 79 judges whether or not the originating party of a call that activated the call processing is mobile station equipment (for simplicity, it is assumed that the equipment is mobile station equipment 70, 80) located within a wireless zone formed by the local station.

Furthermore, when the result of the judgement is true, the processor 79 sends a "reserving notice" meaning that the call processing for the corresponding call is suspended and the channel control necessary for origination will be automatically activated as soon as the period ends to the mobile station equipment 70, 80 through the radio interfacing part 93, communication link 84L, radio control station equipment 83, 74, communication link 81L, and radio base station equipment 81, 73.

However, when the result of the judgement described above is false, the processor 79 sends a "response withholding notice" meaning that response to the corresponding termination call is suspended, as one of the messages, a line signal, and a register signal to the originating party that is located opposite to the processor 79 through the switch 94.

When the terminal of the originating party recognizes the "response withholding notice", the terminal recognizes that the corresponding originating call has become an incompleted call.

In the exchange 84, the processor 79 refrains from the call processing associated with the corresponding call during the period for which the restriction processing E should be done, and recognizes a state (hereinafter referred to as the "non-restrictive state)" in which it is not necessary to perform the restriction processing E after completion of the high speed recognition processing C performed subsequently.

Note that it is not always necessary that the high speed recognition processing be performed by the processor 79. For example, the processing may be carried out by any of the mobile station equipment 70, 80, radio base station equipment 81, 73, and radio control station equipment 83, 74.

When the processor 79 recognizes the aforementioned non-restrictive state, the processor 79 judges whether or not useful control information is held in the register or not. When the result of the judgement is false, no special processing is performed.

However, when the result of the judgement is true, the processor 79 judges whether or not a call indicated by the useful control information corresponds to a originating call of the mobile station equipment 70, 80.

When the result of the judgement is true, the processor 79 sends, as a message, a notice re-origination meaning that re-origination in response to an originating call previously suspended is started to the mobile station equipment 70, 80 through the radio interfacing part 93, communication link 84L, radio control station equipment 83, 74, communication link 81L, and radio base station equipment 81, 73.

Furthermore, the processor 79 automatically performs the call processing for realizing callback to the mobile station equipment 70, 80 and re-origination to the terminating party indicated by the control information, by referring to the control information stored in the register.

When the result of the judgement is false, the processor 79 sends, as a message, a callback starting notice, meaning that callback to the originating party corresponding to the termination call for which response has previously suspended to the terminal of the originating party that is opposite to the processor 79 through the switch 94.

The processor 79 automatically performs the call processing for realizing callback to the originating party indicated by the control information and re-origination to the mobile station equipment 70, 80, by referring to the control information stored in the register.

It is to be noted that neither the procedure of the call processing nor the operation of the radio control station equipment 83, 74, radio base station equipment 81, 73, and mobile station equipment 70, 80 operating in association with each other in the process of the call processing constitutes features of the present invention. Rather, they can be realized by application of various known techniques and are not described herein.

That is, when origination or the acceptance of termination calls is restricted because the speeds of the mobile station equipment 70, 80 exceed the given upper limit, the aforementioned re-origination and callback are automatically done mainly under control of the exchanges 84, 78.

Accordingly, in the present embodiment, accidents that would normally occur in the mobile station equipment 70, 80 can be prevented and the service quality and the serviceability are improved without urging the originating party and the terminating party of a call for which channel control is aborted to perform cumbersome operations and without modifying the structure of software to be loaded in the mobile station equipment 70, 80.

The operation of the eleventh embodiment of the present invention is hereinafter described by referring to FIG. 5.

A feature of the present embodiment is that a processor 72 mounted in mobile station equipment 70 performs the following processing regarding completed calls occurring at the local station.

The processor 72 judges according to the result of the high speed recognition processing whether or not the moving speed of the local station exceeds a given upper limit even during the period for which the completed calls that occurred at the local station persist.

Note that it is not always necessary that the high speed recognition processing and speed measuring processing to be performed prior to the high speed recognition processing be performed by the mobile station equipment 70. For example, they may be performed by the radio control station equipment 74 or by the exchange 84.

When the result of the judgement described above is false, the processor 72 performs no special processing.

However, when the result of the judgement is true, the processor 72 releases the radio channel assigned to the corresponding completed call in accordance with the procedure of the channel control, thus quickly aborting the conversation state.

That is, when the moving speed exceeds the given upper limit, continuation of the conversation is restricted and so accidents are prevented more reliably than the first through tenth embodiments.

The operation of the twelfth embodiment of the present invention is hereinafter described by referring to FIG. 5.

The present embodiment is characterized in that a processor 77 installed in radio control station equipment 74 performs the following processing regarding a completed call that has occurred at the local station.

The processor 77 judges based on the result of the high speed recognition processing whether or not the moving speed of the local station exceeds the given upper limit even for each individual completed call that has occurred at the local station and persisting.

It is not always necessary that the high speed recognition processing and speed measuring processing to be performed prior to the high speed recognition processing be performed by the radio control station equipment 74. For example, they may be performed by the mobile station equipment 70 or the exchange 84.

When the result of the judgement described above is false, the processor 77 performs no special processing.

However, when the result of the judgement is true, the processor 77 releases the radio channel assigned to the corresponding completed call in accordance with the procedure of the channel control, thus quickly aborting the conversation state.

That is, when the moving speed of the mobile station equipment 70 exceeds the given upper limit, continuation of conversation is restricted without modifying the structure of software to be loaded in the mobile station equipment 70 and, therefore, accidents as mentioned above are prevented more reliably.

The operation of the thirteenth embodiment of the invention is hereinafter described by referring to FIG. 5.

The present embodiment is characterized in that a processor 79 installed in an exchange 84 performs the following processing regarding a completed call occurring at the local station.

The processor 79 judges based on the result of the high speed recognition processing whether or not the moving speed of the local station exceeds the given upper limit even for each individual completed call that has occurred at the local station and persisting.

It is not always necessary that the high speed recognition processing and speed measuring processing to be performed prior to the high speed recognition processing be performed by the exchange 84. For example, they may be performed by the mobile station equipment 70 or the radio control station equipment 74.

When the result of the judgement described above is false, the processor 79 performs no special processing.

However, when the result of the judgement is true, the processor 79 releases the radio channel and conversation path assigned to the corresponding completed call in accordance with the procedure of the call processing, thus quickly clearing the call.

That is, when the moving speed of the mobile station equipment 70 exceeds the given upper limit, continuation of conversation is restricted without modifying the structure of software to be loaded in the mobile station equipment 70 and, therefore, accidents as mentioned above are prevented more reliably.

In the embodiments described above, functions are distributed variously among the mobile station equipment 70, 80, radio base station equipment 81, 73, radio control station equipment 83, 74, 74A, and exchanges 84, 78.

With respect to these embodiments, in the case they flexibly adapt themselves to the fundamental structure of hardware and software used in the mobile station equipment 70, 80, radio base station equipment 81, 73, radio control station equipment 83, 74, 74A, and exchange 84; when increase of the cost is suppressed, and when the aforementioned accidents are prevented, however, they can be applied according to any desired combination.

In the above embodiments, the relations between the mobile station 80 and both the combination of a radio channel to be assigned to mobile station equipment 80 located within the wireless zone 82 and channels to be formed in communication links 81L and 85 corresponding to the radio channel are not described in detail.

Generally, however, these relations are determined based on the procedure of the channel control and call processing by association of the aforementioned processors 72, 87M, 87B, 87b, 87C, 77, 87c, 87E, and 79 with each other for each individual call. The relations are appropriately maintained or referenced. Since they are not features of the invention, they are not described herein.

In the embodiments described above, none of channel allocation, zone configuration, multiple access system, and modulation/demodulation system to be applied to the mobile communication system according to the present invention are shown.

It is to be understood, however, any form of these channel allocations, zone configuration, multiple access system, and modulation/demodulation system is applicable to the invention.

In the embodiments described above, description of the operation of each portion is based on the assumption that a call undergoing channel control or call processing to be performed at the radio base station equipment 81, 73, radio control station equipment 83, 74, 74A, and exchange 84 is the call that has occurred in the mobile station equipment 70 or 80.

However, the processing for recognizing the call or the mobile station equipment undergoing the channel control or call processing is not a feature of the invention, similarly to the form and contents of a message delivered each other by cooperation of the mobile station equipment 70, 80, radio base station equipment 81, 73, radio control station equipment 83, 74, 74A, and exchange 84. Furthermore, they are realized utilizing various known techniques. Therefore, for simplicity, description of them is omitted.

It is to be understood that the present invention is not limited to the embodiments described above and that they can be modified variously within the scope of the invention. Furthermore, any improvement may be made to part or all of the constituting machines, units, or equipment.

What is claimed is:

1. A base station equipment comprising:
   a radio interfacing means for forming a wireless zone, for forming a radio transmission path between a singular or plurality of mobile station(s) located in the wireless zone and a local station, and for receiving and transmitting transmission information through said radio transmission path;
   a channel controlling means for channel controlling said wireless zone by associating with said mobile station through said radio interfacing means;
   a speed monitoring means for monitoring the speed of each said mobile station accessing to a radio transmission path formed by said radio interfacing means, under channel controlling performed by said channel controlling means; and
   a speed judging means for judging whether or not the speed monitored by said speed monitoring means exceeds the predetermined upper limit, wherein
   said channel controlling means aborts channel control of a call occurred at each said mobile station, and in which the result of the judgement made by said speed judging means is true.

2. A base station equipment according to claim 1, wherein said speed monitoring means monitors the transmission quality of a received wave that has reached said radio interfacing means in each mobile station and
   reduces a frequency which said transmission quality has deteriorated at to the speed.

3. A base station equipment according to claim 1, further comprising a man-machine interfacing means for man-machine interfacing in relation to a notification of a mobile station whose channel control was aborted by a channel controlling means, and/or that the channel control was aborted.

4. A base station equipment according to claim 1, wherein a channel controlling means keeps information needed for a continuation or retry on a channel control to be aborted, and
   continues or retries said channel control by applying said information when the result of the judgement which was the factor for the abortion of said channel control reverts to false from true.

5. A base station equipment according to claim 4, wherein said channel controlling means clears a completed call when a call whose channel control is to be aborted is said completed call.

6. A base station equipment according to claim 1, wherein functions are distributed into a radio control station equipment which initiatively performs channel control and a radio base station equipment which interfaces between said radio control station equipment and a radio transmission path.

7. A base station equipment comprising:
   a radio interfacing means for forming a wireless zone together with forming a radio transmission path between a singular or plurality of mobile station(s) located in the wireless zone and a local station, and for receiving and transmitting transmission information through said radio transmission path;
   a channel controlling means for channel controlling said wireless zone by associating with said mobile station through said radio interfacing means;
   a speed monitoring means for monitoring the speed of each mobile station accessing to a radio transmission path formed by said radio interfacing means, under channel controlling performed by said channel controlling means; and a speed judging means for judging whether or not the speed monitored by said speed monitoring means exceeds the predetermined upper limit, wherein channel controlling means demands abortion of a channel control to said radio interfacing means and to a mobile station through said radio interfacing means, or abortion of a call processing to an exchange, on a call which occurred at each said mobile station, in which the result of the judgement made by said speed judging means is true.

8. A base station equipment according to claim 7, wherein said speed monitoring means monitors the transmission quality of a received wave that has reached said radio interfacing means in each mobile station and reduces a frequency which said transmission quality has deteriorated at to the speed.

9. A base station equipment according to claim 7, wherein functions are distributed into a radio control station equipment which initiatively performs channel control and a radio base station equipment which interfaces between said radio control station equipment and a radio transmission path.

10. A base station equipment comprising:

a radio interfacing means for forming a wireless zone together with forming a radio transmission path between a singular or a plurality of mobile station(s) located in the wireless zone and a local station, and for receiving and transmitting transmission information through said radio transmission path;

a channel controlling means for channel controlling said wireless zone by associating with said mobile station through said radio interfacing means; and a speed monitoring means for monitoring the speed of each said mobile station, which accesses to a radio transmission path formed by said radio interfacing means, under channel controlling performed by said channel controlling means; wherein said channel controlling means informs the speed, which was monitored by said speed monitoring means, to said each mobile station or to an exchange, obtains the result of the judgement made on the speed which was informed by said mobile stations or exchange, and aborts channel control on a call which occurred at a mobile station moving at the speed in which the result of the judgement is true.

11. A base station equipment according to claim 10, wherein said speed monitoring means monitors the transmission quality of a received wave that has reached said radio interfacing means in each mobile station and reduces a frequency which said transmission quality has deteriorated at to the speed.

12. A base station equipment according to claim 10, further comprising a man-machine interfacing means for man-machine interfacing in relation to a notification of a mobile station whose channel control was aborted by a channel controlling means, and/or that the channel control was aborted.

13. A base station equipment according to claim 10, wherein a channel controlling means keeps information needed for a continuation or retry on a channel control to be aborted, and continues or retries said channel control by applying said information when the result of the judgement which was the factor for the abortion of said channel control reverts to false from true.

14. A base station equipment according to claim 10, wherein said channel controlling means clears a completed call when a call whose channel control is to be aborted is said completed call.

15. A base station equipment according to claim 10, wherein functions are distributed into a radio control station equipment which initiatively performs channel control and a radio base station equipment which interfaces between said radio control station equipment and a radio transmission path.

16. A base station equipment comprising:

a radio interfacing means for forming a wireless zone, forming a radio transmission path between a singular or a plurality of mobile station(s) located in the wireless zone and a local station, and receiving and transmitting transmission information through said radio transmission path;

a channel controlling means for channel controlling said wireless zone by associating with said mobile station through said radio interfacing means; and a speed monitoring means for monitoring the speed of each said mobile station accessing to a radio transmission path formed by said radio interfacing means, under channel controlling performed by said channel controlling means; wherein said channel controlling means informs the speed, which was monitored by said speed monitoring means, to a mobile station or to an exchange.

17. A base station equipment according to claim 16, wherein said speed monitoring means monitors the transmission quality of a received wave that has reached said radio interfacing means in each mobile station and reduces a frequency which said transmission quality has deteriorated at to the speed.

18. A base station equipment according to claim 16, wherein functions are distributed into a radio control station equipment which initiatively performs channel control and a radio base station equipment which interfaces between said radio control station equipment and a radio transmission path.

19. A base station equipment comprising:

a radio interfacing means for forming a wireless zone, forming a radio transmission path between a singular or plurality of mobile station(s) located in the wireless zone and a local station, and for receiving and transmitting transmission information through said radio transmission path;

a channel controlling means for channel controlling said wireless zone by associating with said mobile station through said radio interfacing means; and a speed judging means for obtaining the speed, of each said mobile station, given from said radio interfacing means and from said mobile station through said channel controlling means or given from an exchange through the channel controlling means and for judging individually whether or not said speed exceeds the predetermined upper limit, wherein said channel controlling means aborts channel control on a call which occurred at each said mobile station, moving at the speed in which the result of the judgement made by said speed judging means is true.

20. A base station equipment according to claim 19, wherein said speed monitoring means monitors the transmission quality of a received wave that has reached said radio interfacing means in each mobile station and reduces a frequency which said transmission quality has deteriorated at to the speed.

21. A base station equipment according to claim 19, further comprising a man-machine interfacing means for man-machine interfacing in relation to a notification of a mobile station whose channel control was aborted by a channel controlling means, and/or that the channel control was aborted.

22. A base station equipment according to claim 19, wherein a channel controlling means keeps information needed for a continuation or retry on a channel control to be aborted, and continues or retries said channel control by applying said information when the result of the judgement which was the factor for the abortion of said channel control reverts to false from true.

23. A base station equipment according to claim 19, wherein said channel controlling means clears a completed call when a call whose channel control is to be aborted is said completed call.

24. A base station equipment according to claim 19, wherein functions are distributed into a radio control station equipment which initiatively performs channel control and a radio base station equipment which interfaces between said radio control station equipment and a radio transmission path.

25. A base station equipment comprising:

a radio interfacing means for forming a wireless zone, forming a radio transmission path between a singular or plurality of mobile station(s) located in the wireless zone and a local station, and for receiving and transmitting transmission information through said radio transmission path;

a channel controlling means for channel controlling said wireless zone by associating with said mobile station through said radio interfacing means; and a speed judging means for obtaining each speed given from said radio interfacing means and said mobile station through said channel controlling means or given from an exchange through the channel controlling means of said mobile station and for judging individually whether or not said speed exceeds the predetermined upper limit, wherein said channel controlling means demands abortion of said channel control to each said mobile station and abortion of call processing on an exchange, of a call which occurred at each said mobile station, moving at the speed in which the result of the judgement made by said speed judging means is true.

26. A base station equipment according to claim 25, wherein functions are distributed into a radio control station equipment which initiatively performs channel control and a radio base station equipment which interfaces between said radio control station equipment and a radio transmission path.

27. A base station equipment comprising a radio interfacing means for forming a wireless zone, forming a radio transmission path between a mobile station located in the wireless zone and a local station, and for receiving and transmitting transmission information through said radio transmission path and a channel controlling means for channel controlling said wireless zone by associating with said mobile station through said radio interfacing means, wherein said channel controlling means obtains the result of the judgement of whether or not the speed of each of said mobile stations exceeds a predetermined upper limit through said radio interfacing means or from an exchange, and aborts channel control of a call which occurred at a mobile station in which the result of said judgement is true.

28. A base station equipment according to claim 27, further comprising a man-machine interfacing means for man-machine interfacing in relation to a notification of a mobile station whose channel control was aborted by a channel controlling means, and/or that the channel control was aborted.

29. A base station equipment according to claim 27, wherein a channel controlling means keeps information needed for a continuation or retry on a channel control to be aborted, and continues or retries said channel control by applying said information when the result of the judgement which was the factor for the abortion-of said channel control reverts to false from true.

30. A base station equipment according to claim 27, wherein said channel controlling means clears a completed call when a call whose channel control is to be aborted is said completed call.

31. A base station equipment according to claim 27, wherein functions are distributed into a radio control station equipment which initiatively performs channel control and a radio base station equipment which interfaces between said radio control station equipment and a radio transmission path.

32. A base station equipment according to claim 27, wherein functions are distributed into a radio control station equipment which initiatively performs channel control and a radio base station equipment which interfaces between said radio control station equipment and a radio transmission path.

33. A base station equipment comprising:

a radio interfacing means for forming a wireless zone, forming a radio transmission path between a mobile station located in the wireless zone and a local station, and for receiving and transmitting transmission information through said radio transmission path;

a channel controlling means for channel controlling said wireless zone by associating with said mobile station through said radio interfacing means; and a relaying means for mutually performing, between both or either of said mobile station and an exchange, a relay on all or part of:

the speed of said mobile station;

the difference between said speed and a predetermined upper limit; and a demand to abort said channel control and a call processing performed by said exchange.

* * * * *

UNITED STATES PATENT AND TRADEMARK OFFICE
CERTIFICATE OF CORRECTION

PATENT NO. : 6,816,731 B1
DATED : November 9, 2004
INVENTOR(S) : J. Maruyama

It is certified that error appears in the above-identified patent and that said Letters Patent is hereby corrected as shown below:

Title page,
Item [30], should be
-- [30] Foreign Application Priority Data
July 19, 1999   (JP) ………………….. 11-204737 --

Signed and Sealed this

Second Day of August, 2005

JON W. DUDAS
*Director of the United States Patent and Trademark Office*